(12) United States Patent
Iwai et al.

(10) Patent No.: US 10,891,061 B2
(45) Date of Patent: Jan. 12, 2021

(54) ELECTRONIC DEVICE, COMPUTER SYSTEM, AND CONTROL METHOD

(71) Applicant: Toshiba Memory Corporation, Minato-ku (JP)

(72) Inventors: Daisuke Iwai, Yokohama (JP); Kenichiro Yoshii, Bunkyo (JP); Tetsuya Sunata, Yokohama (JP)

(73) Assignee: Toshiba Memory Corporation, Minato-ku (JP)

( * ) Notice: Subject to any disclaimer, the term of this patent is extended or adjusted under 35 U.S.C. 154(b) by 65 days.

(21) Appl. No.: 16/052,880

(22) Filed: Aug. 2, 2018

(65) Prior Publication Data
US 2019/0303024 A1   Oct. 3, 2019

(30) Foreign Application Priority Data
Mar. 29, 2018   (JP) .................................. 2018-065039

(51) Int. Cl.
*G06F 3/06* (2006.01)

(52) U.S. Cl.
CPC .......... *G06F 3/0625* (2013.01); *G06F 3/0659* (2013.01); *G06F 3/0679* (2013.01)

(58) Field of Classification Search
CPC ..... G06F 3/0625; G06F 3/0659; G06F 3/0679
See application file for complete search history.

(56) References Cited

U.S. PATENT DOCUMENTS

| | | |
|---|---|---|
| 8,122,158 B1 | 2/2012 | Kudva et al. |
| 9,032,177 B2 | 5/2015 | Alcantara et al. |
| 9,110,786 B2 * | 8/2015 | Carlson ............... G06F 12/0246 |
| 9,880,749 B2 | 1/2018 | Yamaguchi et al. |
| 2004/0177221 A1 * | 9/2004 | Bridge .................. G06F 3/0611 |
| | | 711/114 |
| 2013/0019050 A1 | 1/2013 | Somanache et al. |

(Continued)

FOREIGN PATENT DOCUMENTS

| | | |
|---|---|---|
| JP | 2014-154023 | 8/2014 |
| TW | 201305821 A1 | 2/2013 |
| TW | 201502977 A | 1/2015 |

OTHER PUBLICATIONS

Yan, Wei et al., An Efficient Parallel Executing Command Scheduler for NAND Flash Storage Systems, IEEE, 2013 (Year: 2013).*

(Continued)

*Primary Examiner* — Ryan Bertram
*Assistant Examiner* — Edmund H Kwong
(74) *Attorney, Agent, or Firm* — Oblon, McClelland, Maier & Neustadt, L.L.P.

(57) ABSTRACT

According to one embodiment, an electronic device connectable to a host via an interface includes a nonvolatile memory and a controller electrically connected to the nonvolatile memory and capable of processing commands issued by the host in parallel. When the electronic device is connected to the host, the controller determines, when one or more commands to be processed by one or more deadline times, respectively, are issued by the host, scheduling indicative of timings at which the one or more commands are processed, respectively, based on the one or more deadline times. The controller performs processing corresponding to the one or more commands in accordance with the scheduling.

18 Claims, 18 Drawing Sheets

(56) References Cited

U.S. PATENT DOCUMENTS

| | | | |
|---|---|---|---|
| 2013/0227583 A1* | 8/2013 | Gargash | G06F 1/329 718/104 |
| 2015/0012670 A1 | 1/2015 | Tseng et al. | |
| 2015/0095605 A1* | 4/2015 | Roberts | G06F 3/0659 711/167 |
| 2016/0026402 A1 | 1/2016 | Alcantara | |
| 2018/0074881 A1* | 3/2018 | Burden | G06F 11/1084 |
| 2018/0088834 A1* | 3/2018 | Sundaram | G06F 12/0246 |

OTHER PUBLICATIONS

NVM Express, Inc., "NVM Express", (Revision 1.2.1), Jun. 2016, pp. 217.
NVM Express, Inc., "NVM Express", (Revision 1.3), May 2017, pp. 282.

* cited by examiner

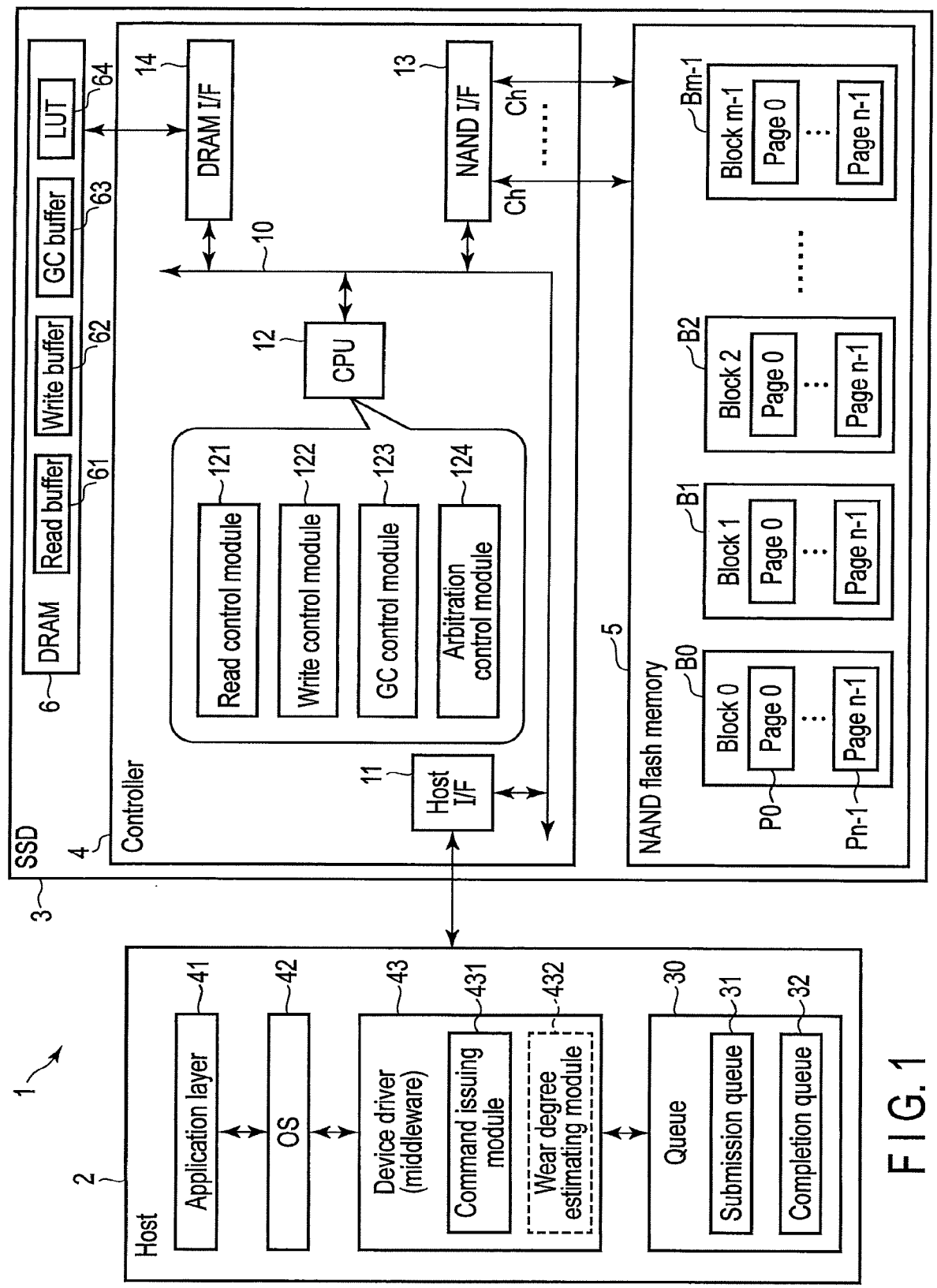
F I G. 1

| Bytes | Bits | | | | | | | |
|---|---|---|---|---|---|---|---|---|
| | 31 | 30 | 29-26 | 25-16 | 15 | 14-10 | 9-8 | 7-0 |
| 63-60 | CDW15: Expected logical block application tag (ELBAT) and tag mask (ELBATM) | | | | | | | |
| 59-56 | CDW14: Expected initial logical block reference tag (EILBRT) | | | | | | | |
| 55-52 | CDW13: Reserved | | | | | Dataset management (DSM) | | |
| 51-48 | LR | FUA | PRINFO | [Reserved] | Number of logical blocks (NLB) | | | |
| 47-40 | CDW11,CDW10: Starting LBA | | | | | | | |
| 39-32 | CDW9,CDW8: PRP2 | | | | | | | |
| 31-24 | CDW7,CDW6: PRP1 | | | | | | | |
| 23-16 | CDW5,CDW4: MPTR | | | | | | | |
| 15-8 | CDW3,CDW2: [Reserved] ⇨ Deadline timestamp (in milliseconds) | | | | | | | |
| 7-4 | CDW1: Namespace ID | | | | | | | |
| 3-0 | CDW0: Command ID | | | | 0 | [Reserved] | 0 | Write(01h), Read(02h) |

FIG. 3

| Bytes | Description |
|---|---|
| 5-0 | Timestamp<br>(For example, number of milliseconds that have elapsed since midnight on January 1, 1970 (UTC)) |
| 7-6 | Reserved |

FIG. 4

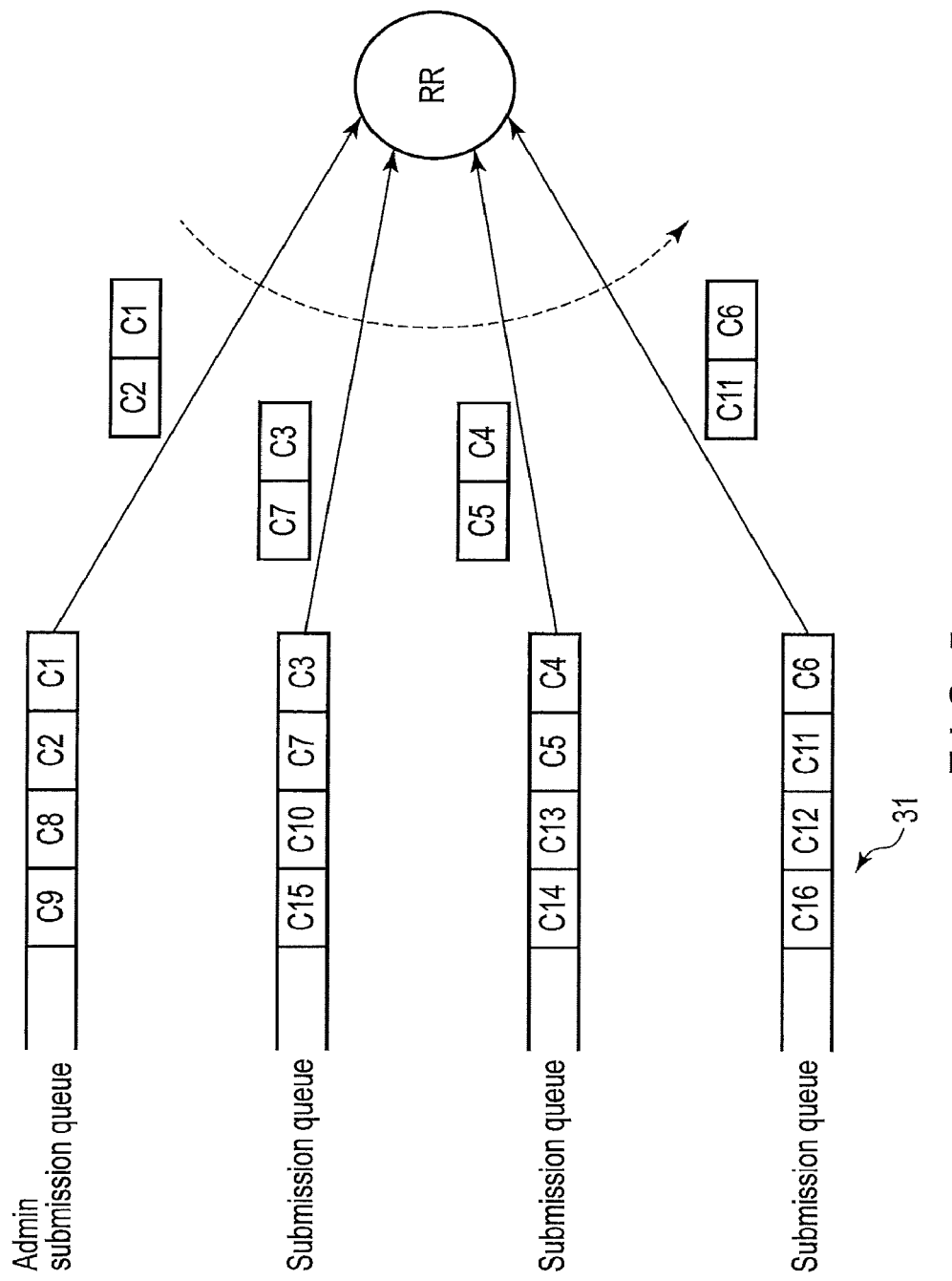
F I G. 5

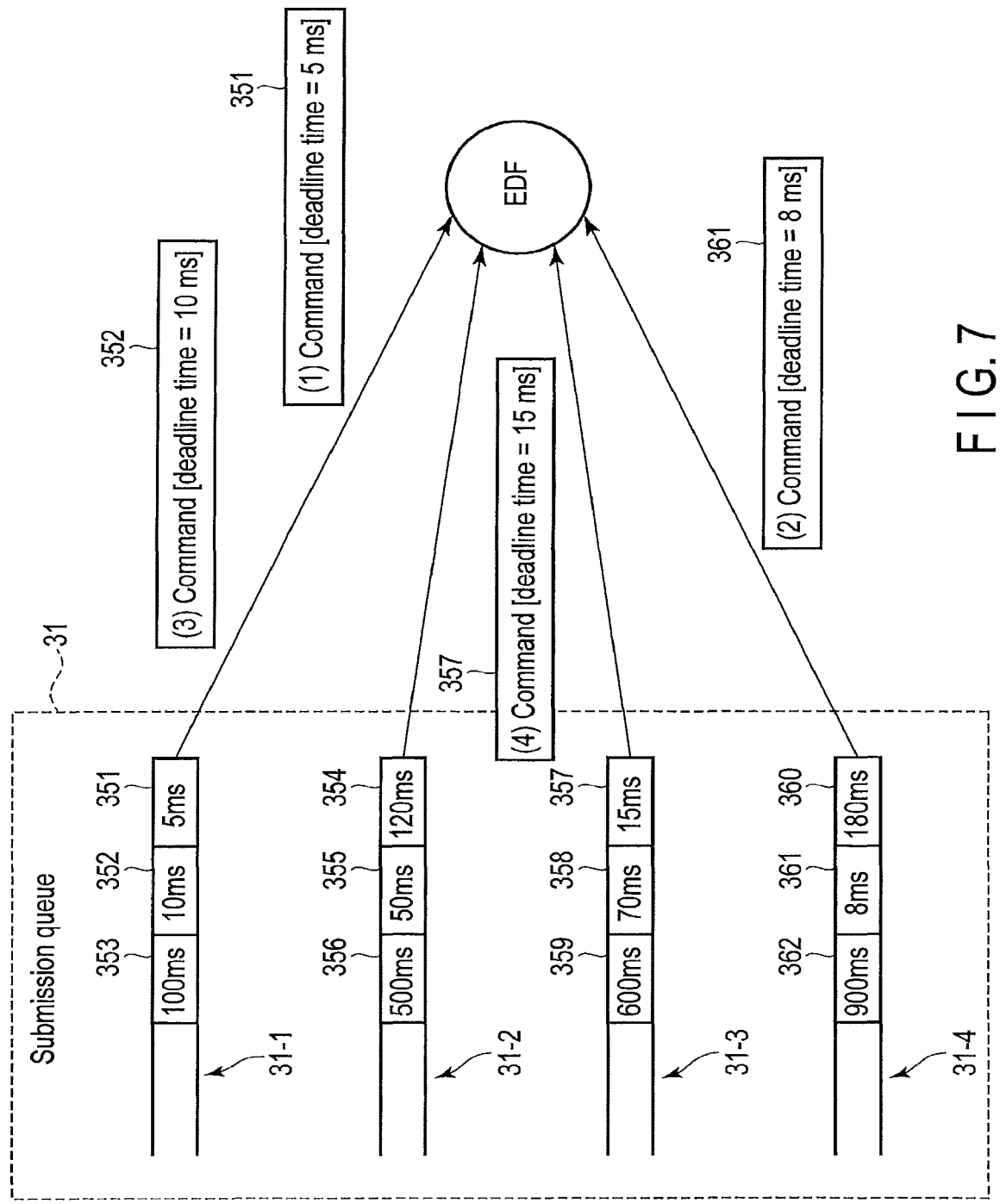
F I G. 7

| Bytes | Bits | | | | | | |
|---|---|---|---|---|---|---|---|
| | 31 | 30 | 29-28 | 24-25 | 24-17 | 16 | 15-0 |
| 15-12 | DNR | M | [Reserved] ⇨ Expired | SCT | SC | P | Command ID |
| 11-8 | SQID | | | | SQHD | | |
| 7-4 | DW1: Completed timestamp (Hi) | | | | | | |
| 3-0 | DW0: Completed timestamp (Lo) | | | | | | |
F I G. 8
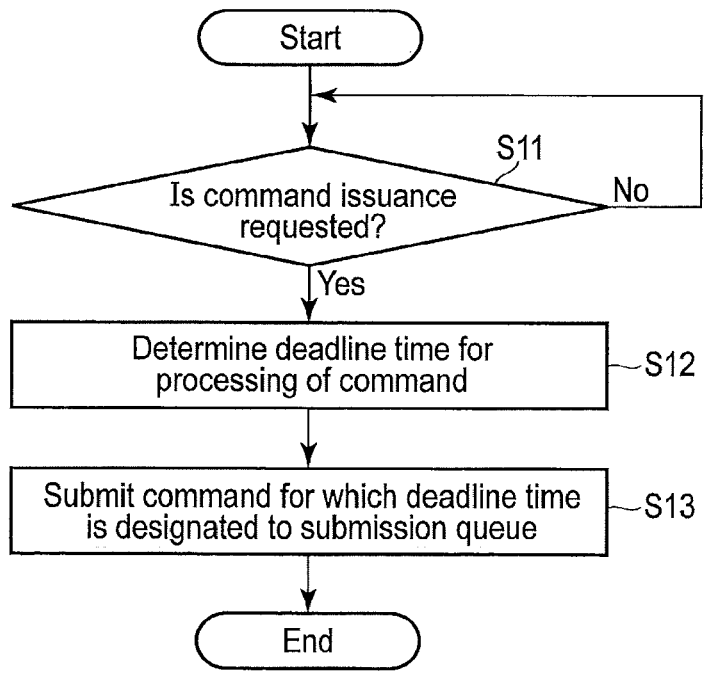
F I G. 9

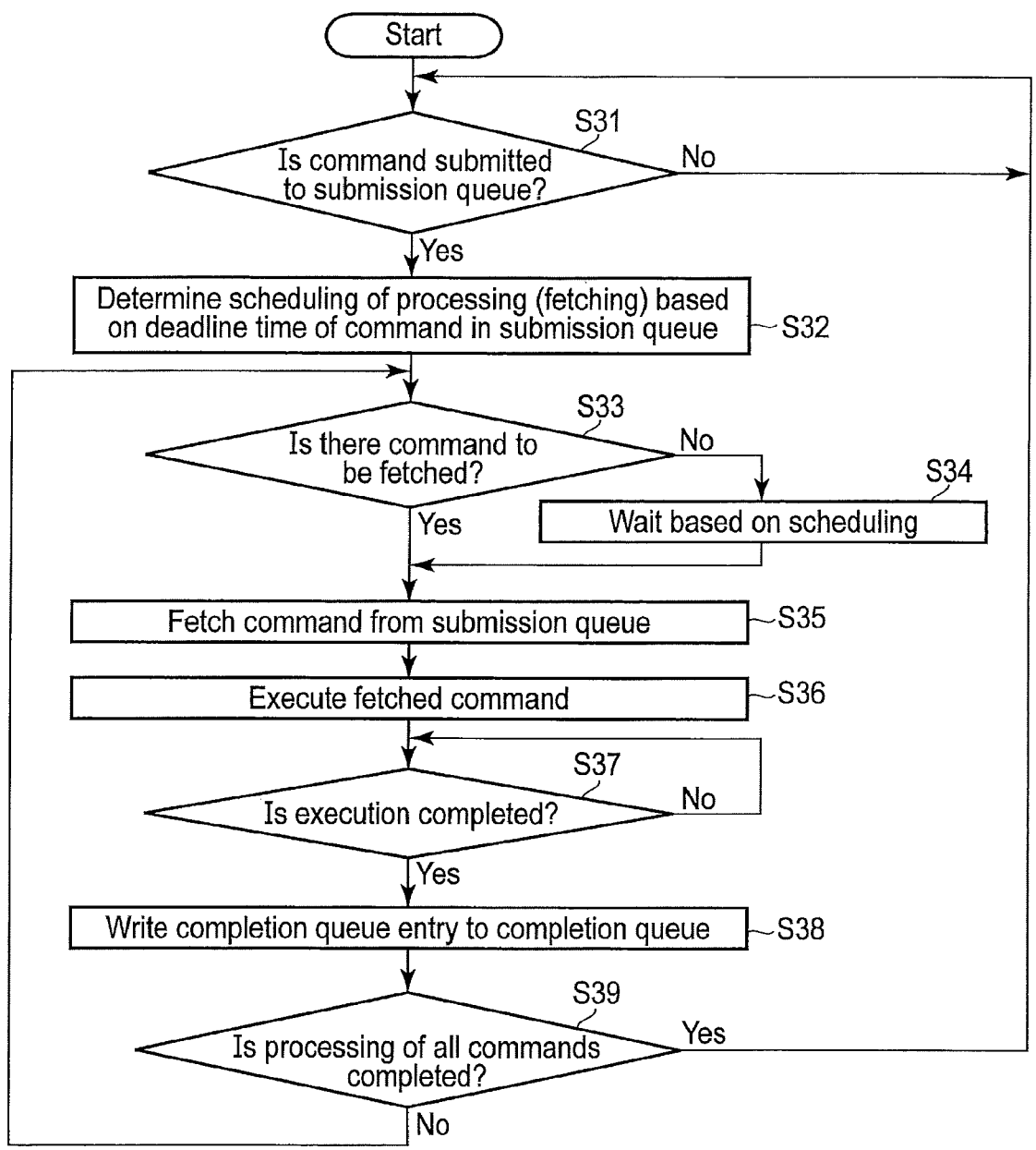
F I G. 11

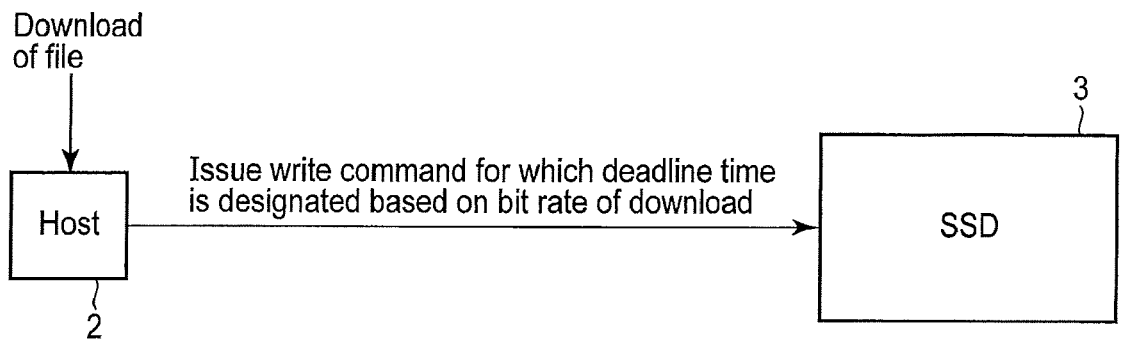
F I G. 13
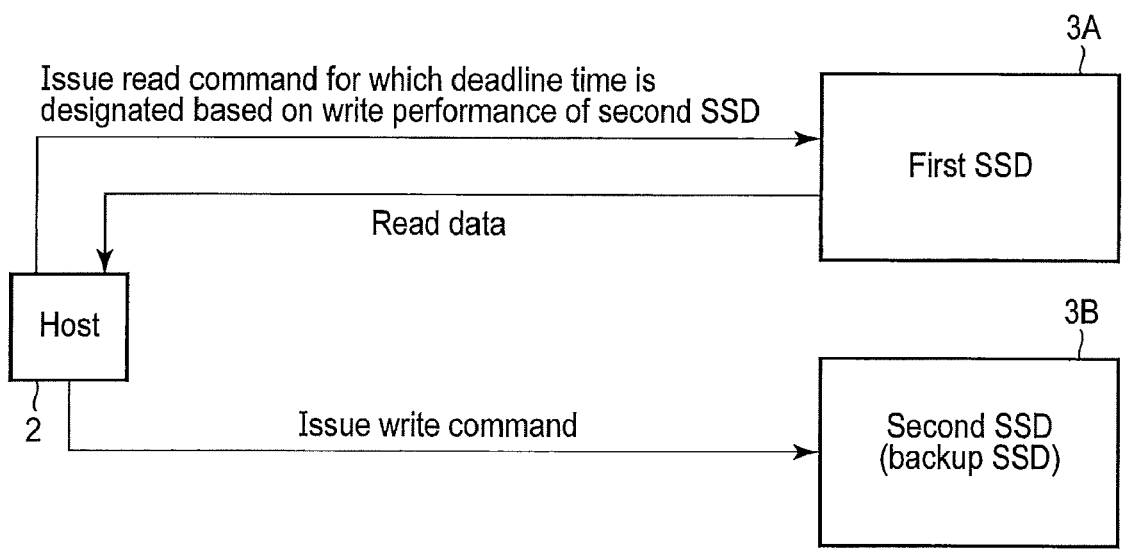
F I G. 14

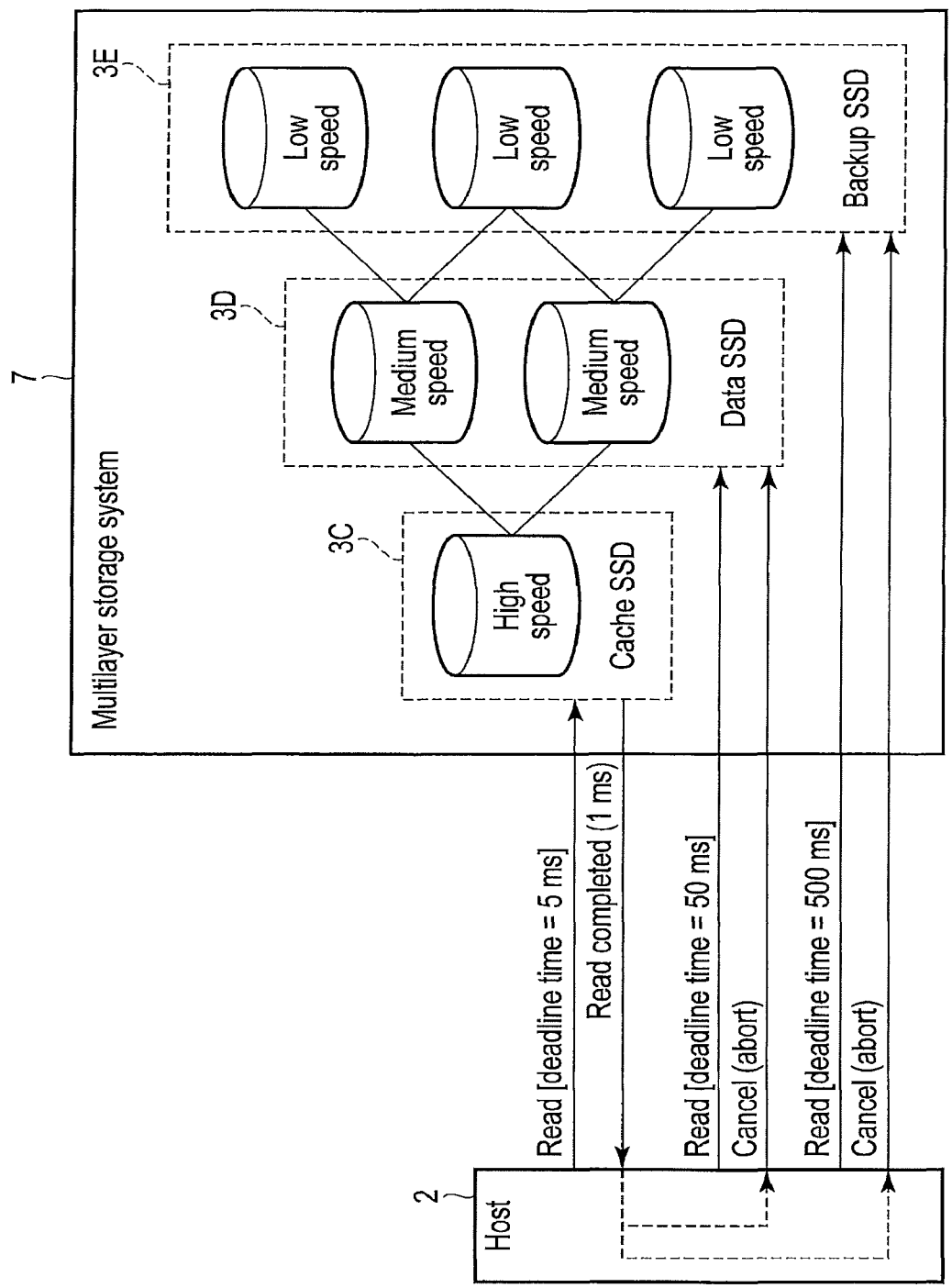
F I G. 15

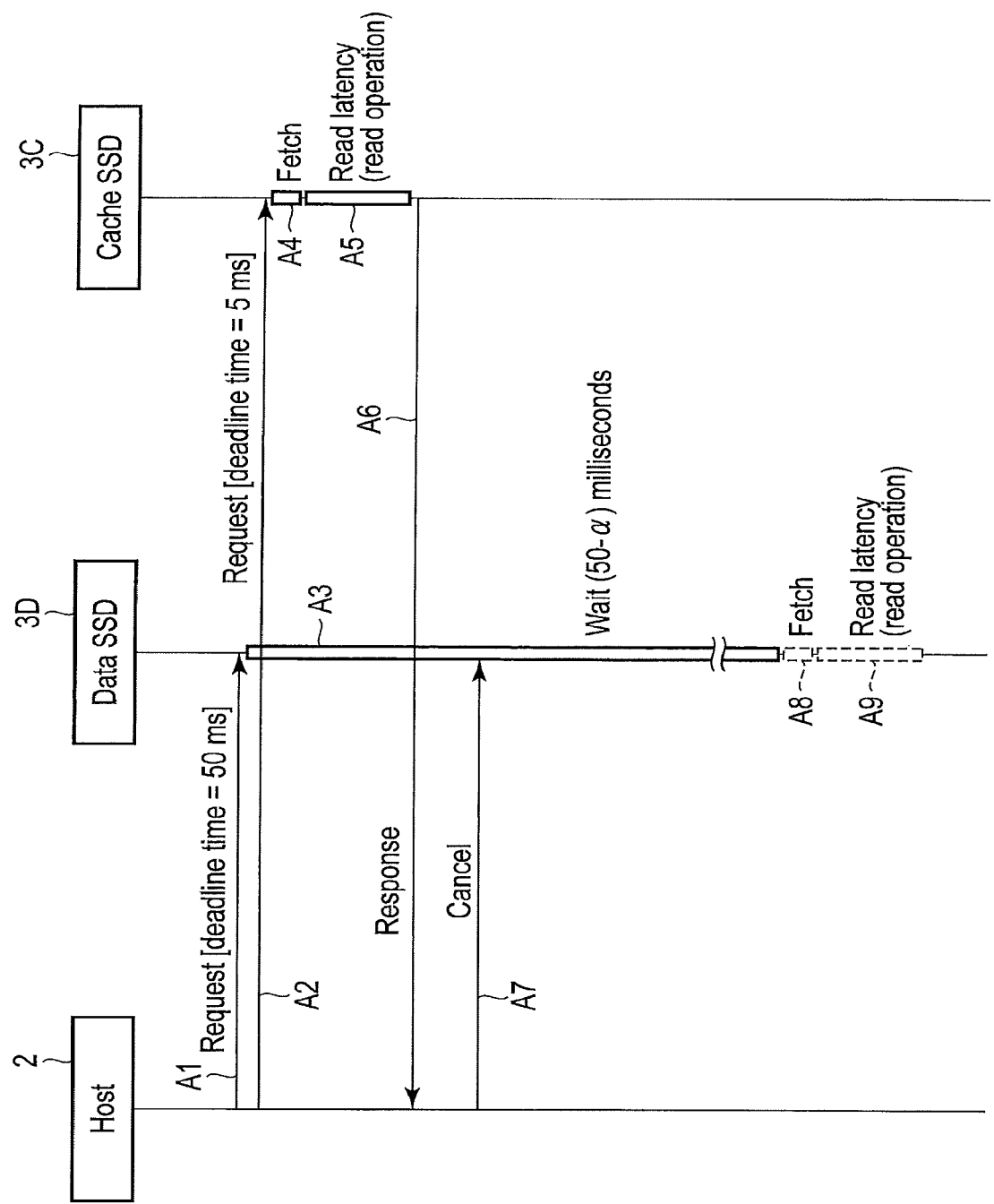
F I G. 16

| Power supply state | Maximum power [mW] | Ratio of period without scheduling based on deadline time [%] | Ratio of period with scheduling based on deadline time [%] |
|---|---|---|---|
| PS0 | 5,000 | 10% | 10% |
| PS3 | 50 | 90% | 1% |
| PS4 | 2.5 | 0% | 89% |
| Total power [mW] | — | 545[mW] | 503[mW] |

Active time is same for same processing content

Power reduction of 7.8% in above ratios

FIG. 19

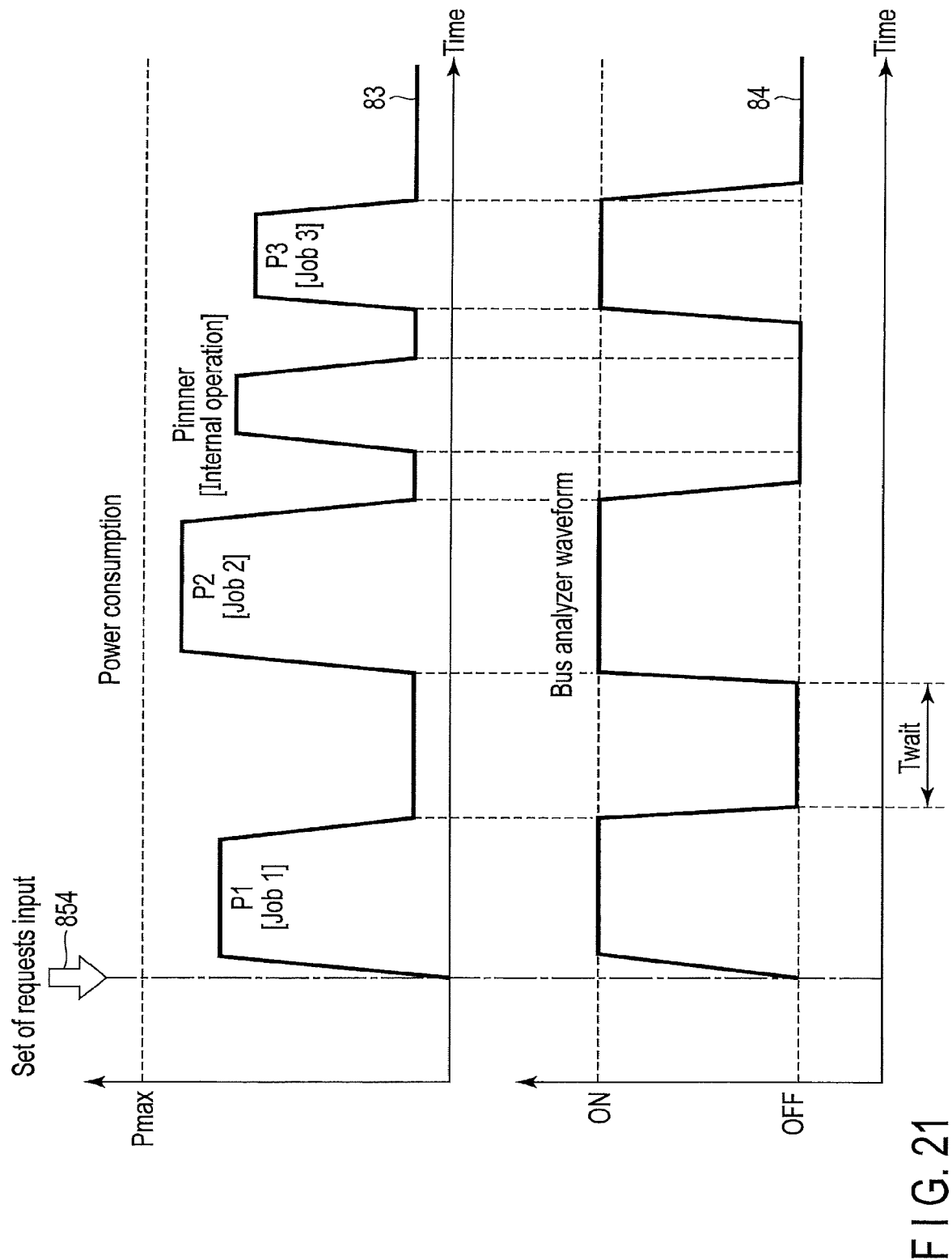
F I G. 21

ELECTRONIC DEVICE, COMPUTER SYSTEM, AND CONTROL METHOD

CROSS-REFERENCE TO RELATED APPLICATIONS

This application is based upon and claims the benefit of priority from Japanese Patent Application No. 2018-065039, filed Mar. 29, 2018, the entire contents of which are incorporated herein by reference.

FIELD

Embodiments described herein relate generally to an electronic device and a computer system including a nonvolatile memory, and a control method thereof.

BACKGROUND

In recent years, storage equipped with a nonvolatile memory has been widely used.

As one type of such storage, a solid state drive (SSD) having a NAND flash memory is known. SSD is used as the main storage of various computing devices.

A current SSD responds a command request by a host by processing the command with great effort (best effort) at any time. Great effort means that, for example, when there are multiple request commands such as a read or write from the host (PC) to a storage device (SSD), a sequence of processing of sequentially processing all requested commands to read or write data until a notification of processing completion is performed as fast as possible until there is no command request by the host.

For SSDs installed on portable PCs driven by batteries, it is important to shift the SSDs to the low power consumption state. Generally, such an SSD enters a low power consumption state after a state in which no processing is performed for a while (for example, for several seconds) has elapsed after all the commands submitted to the command queue are processed.

In actual use cases, it is also assumed that the SSD does not need to operate at full power, especially in the SSD for consumers. Therefore, it is necessary to realize new functions capable of reducing power consumption by scheduling commands according to the situation.

BRIEF DESCRIPTION OF THE DRAWINGS

FIG. 1 is a block diagram showing a configuration example of a computer system according to an embodiment.

FIG. 3 is a diagram showing an example of a format of a command (submission queue entry) designating a deadline time used in the computer system of the embodiment.

FIG. 4 is a diagram showing an example of the format of the deadline time in FIG. 3.

FIG. 5 is a diagram showing an example of round robin arbitration of commands.

FIG. 7 is a diagram showing an example of command arbitration in the computer system of the embodiment.

FIG. 8 is a diagram showing an example of the format of a completion queue entry including a completion time used in the computer system of the embodiment.

FIG. 9 is a flowchart showing an example of the procedure of command issuance processing performed by a host provided in the computer system of the embodiment.

FIG. 11 is a flowchart showing an example of the an SSD provided in the computer system of the embodiment.

FIG. 13 is a diagram illustrating a download operation in the computer system of the embodiment.

FIG. 14 is a diagram illustrating a backup operation in the computer system of the embodiment.

FIG. 15 is a diagram illustrating an access operation to a multilayer storage system in the computer system of the embodiment.

FIG. 16 is a diagram showing a processing sequence in the access operation of FIG. 15.

FIG. 19 is a view illustrating an effect of reducing power consumption in the SSD provided in the computer system of the embodiment.

FIG. 21 is a diagram showing an example of transition of power consumption and the bus analyzer waveform in the computer system of the embodiment.

DETAILED DESCRIPTION

Figure 2:
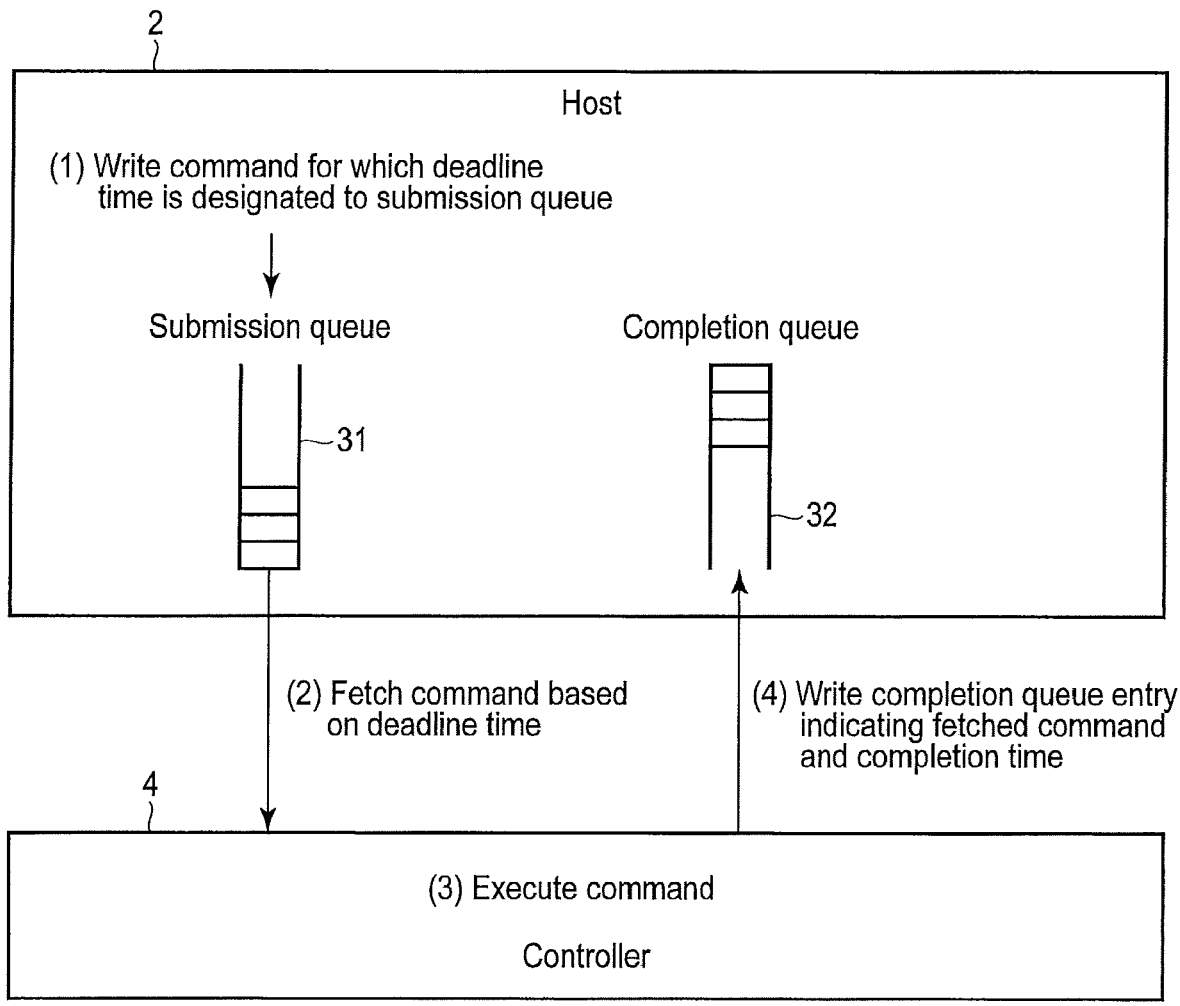
FIG. 2 is a diagram illustrating an example of operation of command processing in the computer system of the embodiment.

Various embodiments will be described hereinafter with reference to the accompanying drawings.

In general, according to one embodiment, an electronic device connectable to a host via an interface includes a nonvolatile memory and a controller electrically connected to the nonvolatile memory and capable of processing commands issued by the host in parallel. When the electronic device is connected to the host, the controller determines, when one or more commands to be processed by one or more deadline times, respectively, are issued by the host, scheduling indicative of timings at which the one or more commands are processed, respectively, based on the one or more deadline times. The controller performs processing corresponding to the one or more commands in accordance with the scheduling.

First, referring to FIG. 1, the configuration of a computer system 1 according to an embodiment will be described.

The computer system 1 includes a host (host device) 2, and one or more semiconductor storage devices configured to write data to a nonvolatile memory and to read data from the nonvolatile memory.

The host 2 is an information processing apparatus (computing device) that accesses the semiconductor storage device. The host 2 may be a server (storage server) that stores a large amount of various data in the semiconductor storage device, or may be a personal computer. The semiconductor storage device is realized, for example, as a solid state drive (SSD) 3 including a NAND flash memory.

The SSD 3 can be used as main storage of an information processing apparatus functioning as the host 2. The SSD 3 may be contained in the information processing apparatus or may be connected to the information processing apparatus via a cable or a network.

As an interface for interconnecting the host 2 and the SSD 3, SCSI, Serial Attached SCSI (SAS), ATA, Serial ATA (SATA), PCI Express (PCIe) (registered trademark), Ethernet (registered trademark), Fibre channel, NVM Express (NVMe) (registered trademark), Universal Flash Storage (UFS), embedded multimedia card (eMMC (registered trademark)) or the like can be used.

The SSD 3 includes a controller 4 and a nonvolatile memory (NAND flash memory) 5. The controller 4 can be implemented by a circuit such as a System-on-a-chip (SoC). The SSD 3 may include a random access memory as a volatile memory, for example, a DRAM 6. Alternatively, a random access memory such as an SRAM may be contained in the controller 4.

A random access memory such as the DRAM 6, for example, includes a read buffer (RB) 61, a write buffer (WB) 62 and a GC buffer 63, and a cache area of a look-up table (LUT) 64. The read buffer (RB) 61 is a buffer area for temporarily storing data read from a NAND flash memory 5. The write buffer (WB) 62 and a GC buffer 63 are buffer areas for temporarily storing data to be written to the NAND flash memory 5. The look-up table (LUT) 64 functions as an address conversion table (logical/physical address conversion table). Further, the random access memory such as the DRAM 6 may further include storage areas for various kinds of information used during processing. Note that the DRAM 6 may be provided inside the controller 4. The LUT 64 manages the mapping between each logical address and each physical address of the NAND flash memory 5.

The NAND flash memory 5 may include multiple NAND flash memory chips (multiple NAND flash memory dies). Each chip is implemented as a flash memory configured to be able to store multiple bits per memory cell.

The controller 4 is electrically connected to the NAND flash memory 5 as a nonvolatile memory via a NAND interface 13 such as Toggle DDR, Open NAND Flash Interface (ONFI) or the like. The NAND interface 13 functions as a NAND control circuit configured to control the NAND flash memory 5. The NAND interface 13 may be connected to each of chips in the NAND flash memory 5 via channels.

The controller 4 functions as a memory controller configured to control the NAND flash memory 5.

The controller 4 may also function as a flash translation layer (FTL) configured to execute data management and block management of the NAND flash memory 5. The data management executed by the FTL includes (1) management of mapping information indicative of the correspondence between each logical address and each physical address of the NAND flash memory 5, (2) processing to hide read/write operations in units of page and erase operations in units of block, and the like. The logical address is an address used by the host 2 to address the SSD 3. As a logical address, for example, a logical block address (LBA) is used.

Management of the mapping between each logical block address (LBA) and each physical address is performed by using the LUT 64 functioning as an address conversion table (logical/physical address conversion table). The controller 4 uses the LUT 64 to manage the mapping between each of the LBAs and each physical address in units of a predetermined management size. The physical address corresponding to a certain LBA indicates the physical storage position in the NAND flash memory 5 to which the data of the LBA is written. The LUT 64 may be loaded from the NAND flash memory 5 into the DRAM 6 when the SSD 3 is powered on.

Data can be written to one page only once per P/E cycle. Thus, the controller 4 writes the update data corresponding to a certain LBA to another physical storage position, not to the physical storage position where the previous data corresponding to the LBA is stored. Then, the controller 4 updates the LUT 64 to associate the LBA with the other physical storage position, thereby invalidated the previous data. Hereinafter, data referred to by the LUT 64 (that is, data associated with the logical address) will be called valid data. In addition, data not associated with any logical address will be called invalid data. The valid data is data that may be read from the host 2 later. Invalid data is data that will not be read from the host 2.

Block management includes bad block management, wear leveling, garbage collection (GC), and so on.

The controller 4 may include a host interface 11, a CPU 12, a NAND interface 13, a DRAM interface 14 and the like. The host interface 11, the CPU 12, the NAND interface 13, and the DRAM interface 14 may be interconnected via a bus 10.

The host interface 11 functions as a circuit that receives various commands, for example, I/O commands, various control commands and the like from the host 2. The I/O command may include a write command, a read command, an unmap command (trim command), a format command, a flash command, and the like.

The DRAM interface 14 functions as a DRAM controller configured to control access to the DRAM 6. The storage area of the DRAM 6 is used to store the read buffer (RB) 61, the write buffer (WB) 62, the GC buffer 63, the LUT 64, and the like.

The CPU 12 is a processor configured to control the host interface 11, the NAND interface 13, and the DRAM interface 14. The CPU 12 performs various kinds of processing by executing a control program (firmware) stored in a ROM (not shown) or the like. In addition to the above-described FTL processing, the CPU 12 can execute command processing and the like to process various commands from the host 2. The operation of the CPU 12 is controlled by the above-mentioned firmware executed by the CPU 12. Part or all of the FTL processing and command processing may be performed by dedicated hardware in the controller 4.

Next, the configuration of the host 2 will be described.

The host 2 is an information processing apparatus that executes various programs. Programs executed by the information processing apparatus include an application layer 41, an operating system (OS) 42, a device driver (middleware) 43 and the like.

As is generally known, the OS 42 is software configured to manage the host 2 as a whole, to control the hardware in the host 2, and to execute control to enable each application program to use the hardware and the SSD 3.

The device driver 43 is software to access the SSD 3. The device driver 43 may be used in cooperation with a file system that executes control for file operation (creation, storage, update, deletion, etc.). For example, ZFS, Btrfs, XFS, ext4, NTFS, etc., are used as the file system. Alternatively, a file object system (for example, Ceph Object Storage Daemon) or Key Value Store System (for example, Rocks DB) may be used as the file system.

Various application software threads run on the application layer 41. Examples of application software threads include client software, database software, a virtual machine and the like.

When it is necessary for the application layer 41 to issue a request such as a read command or a write command to the SSD 3, the application layer 41 sends the request to the OS 42. The OS 42 sends the request to the device driver 43. The device driver 43 translates the request into a command (a read command, a write command, etc.). The device driver 43 issues the command obtained by the translation to the SSD 3. When a response from the SSD 3 is received, the device driver 43 sends the response to the OS 42. The OS 42 sends the response to the application layer 41.

The host 2 includes queues 30 for issuing commands to the SSD 3. The queues 30 include, for example, one or more submission queues 31 and one or more completion queues 32. The submission queue 31 is an instruction queue (buffer) with a fixed slot size that the host 2 (host software) uses to issue (submit) commands for execution by the controller 4 of the SSD 3. The completion queue 32 is a response queue (buffer) with a fixed slot size used to post status for completed commands.

The device driver 43 includes a command issuing module 431. When a request from the OS 42 (application layer 41) is received, the command issuing module 431 determines a deadline time by which the command corresponding to the request is to be processed in the SSD 3. Then, the command issuing module 431 issues the command for which the deadline time is designated and submits the command to the submission queue 31.

For example, when there is no need to operate the SSD 3 with full power, the command issuing module 431 determines the deadline time based on at least one of appropriate performance (for example, read performance, write performance, etc.), speed (for example, the read speed, write speed, etc.), and timing (for example, the read time, write time, etc.) that the host 2 requires of the SSD 3. In the SSD 3, by appropriately scheduling the commands based on the designated deadline times, the effect of power saving and improvement of QoS (for example, appropriate resource allocation) can be gained.

Further, the CPU 12 in the controller 4 provided in the SSD 3 can function as a read control module 121, a write control module 122, a GC control module 123, and an arbitration control module 124.

The read control module 121 reads data corresponding to a read command from the NAND flash memory 5 by determining the physical address corresponding to a logical address (LBA) based on the entry in the LUT 64 corresponding to the LBA.

The write control module 122 stores user data received with a write command from the host 2, in the write buffer 62 in the DRAM 6. Then, when the user data in the write unit of the NAND flash memory 5 is stored in the write buffer 62, the write control module 122 transfers the user data in the write unit to a chip (data latch of the chip) of the NAND flash memory 5. The write control module 122 releases the area in the write buffer 62 where the transferred user data was stored.

Next, the write control module 122 instructs the chip of the NAND flash memory 5 to program the user data. That is, the write control module 122 sends a program command to the chip of the NAND flash memory 5 so that the chip is caused to program the transferred user data to the write destination block. A memory cell array in the chip includes multiple blocks. Blocks are roughly divided into blocks (active blocks) that store valid data and into which new data cannot be written and blocks (free blocks) that do not store valid data and can be used to write new data by undergoing erase processing. One block is selected from one or more free blocks and undergoes erase processing before being allocated as a write destination block. The write destination block can store valid data.

The GC control module 123 can also write to the NAND flash memory 5 using the GC buffer 63 in the same manner as the write operation by the write control module 122 described above. The GC control module 123 selects a garbage collection source block (GC source block) from active blocks storing valid data and writes valid data in the GC source block to the garbage collection destination block (GC destination block) secured as a write destination block from free blocks.

In addition, the arbitration control module 124 can fetch entries in the submission queue 31, that is, commands in any order. Each module in the SSD 3 operates according to the fetched command. For example, the read control module 121 performs read processing in accordance with the fetched read command, and the write control module 122 performs write processing in accordance with the fetched write command.

In the initial ATA HDD (Parallel ATA), the next command could not be sent until the processing of one command was completed, but the extension of the command queuing standard in the SATA (Serial ATA) HDD/SSD standard now allows one command queue to accept requesting execution of commands in order. Further, according to the NVMe standard, the standard has been extended so that multiple command queues can accept requesting execution of commands out of order. According to the NVMe standard, the number of command queues (submission queues) can be up to 64K, and the number of commands that can be requested from one command queue can be defined up to 64K.

In an SSD and an OS such as Windows (registered trademark) 10 available on the market, for example, command queues each including 1K entries are created for CPUs (for example, 8) executing the OS, respectively. In this case, up to 1K×8=8K commands can be issued at the same time, and the SSD that receives several thousand commands or more can process commands in any order from innumerable permutations (combinations) of processing. It is difficult to solve the optimum processing order for the SSD having limited calculation resources. For example, all that can be done by the SSD is to process several commands in a submission order from the command queues by a simple round robin (or a weighted round robin) and it is difficult to process commands in a completely fair order.

The arbitration control module 124 according to the present embodiment can execute control so that, based on the deadline time designated for each command stored in the submission queue 31, processing (fetching) is sequentially performed on commands in order of deadline time. When one or more commands are stored in the submission queue 31, the arbitration control module 124 determines scheduling indicating the timing at which each of the one or more commands is processed based on the deadline time designated for each command. For example, the arbitration control module 124 determines the scheduling so that one or more commands are processed by each deadline time and the processing thereof is delayed as much as possible. The scheduling may further indicate to which power state the SSD 3 is set, depending on the timing at which the command is processed. The power state to which the SSD 3 can be set is, for example, a power state of full speed operation, or a low power consumption state of a shallow sleep or a deep sleep. The shallow sleep indicates a shallow sleep state, and the deep sleep indicates a deep sleep state. For example, the power consumed by the SSD 3 set to the shallow sleep is greater than the power consumed by the SSD 3 set to the deep sleep. The arbitration control module 124 controls each unit in the SSD 3 so that processing corresponding to one or more commands is performed in accordance with the determined scheduling.

In general, the SSD 3 does not have a real time clock and thus, the current time cannot be obtained inside the SSD 3. In the NVMe standard, a SetFeatures command, which is an optional command enabling the host 2 to set the current time to the SSD 3 (controller 4), is defined. In the SetFeatures command, "0Eh" indicative of a timestamp is designated as a Feature Identifier to identify which feature to set.

While in the normal power state, the SSD 3 can obtain the current time by counting up an internal timer using the notified current time. If the internal timer also stops in a low power consumption state, it is not possible to count up from the current time and thus, when a transition occurs from the low power consumption state to the normal power state, it is necessary to notify the SSD 3 of the current time from the host 2 each time.

Hereinafter, an example in which the host 2 and the SSD 3 are connected via an interface based on the NVMe standard is shown, but the same can be similarly applicable also when connected by another storage interface such as UFS, SATA, eMMC, SCSI or the like.

An example of the operation of command processing by the host 2 and the controller 4 of the SSD 3 will be described more specifically with reference to FIG. 2.

First, when writing a command to an entry (submission queue entry) in the submission queue 31, the host 2 (command issuing module 431) designates a time at which processing of the command is expected. The "time at which processing is expected" is a time at which a command is to be processed and any time related to processing of a command. As the "time at which processing is expected", for example, a command submission issue time, a processing start time within the SSD 3 (for example, a time at which a command is fetched from the submission queue 31), a time at which the transfer of data according to a command is started, a time at which the transfer of data according to a command is completed, or a time at which notification of an interrupt according to a command is made is used. Hereinafter, the "time at which processing is expected" is also referred to as a deadline time.

The host 2 (command issuing module 431), for example, designates a deadline time by receiving an instruction from the application layer 41. The host 2 calculates (determines) the deadline time using information that may include, for example, the priority of processes, the position of LBA, the reference frequency (access frequency), the size of data to be transferred, the application name, the file system metadata (for example, $MFT in NTFS), the power supply state of the SSD 3, and the like.

The submission queue 31 has a fixed slot size and is used by the host 2 (host software) to issue (submit) commands for execution by the controller 4 of the SSD 3. Each submission queue entry corresponds to a command. Commands are, for example, 64 bytes in size. That is, processing is instructed from the host 2 to the SSD 3 by using a memory area of 64 bytes per command.

FIG. 3 shows an example of the format of a submission queue entry used in the computer system 1. Here, a case where the format of the submission queue entry shown in the NVMe standard (revision 1.3) is changed so as to further designate the information on the deadline time will be described.

When a write command or a read command is issued, "01h" indicating a write or "02h" indicating a read is set to an Opcode (OPC) field corresponding to the [7-0] bits in the [3-0] bytes in the submission queue entry.

The field of [15-8] bytes in the submission queue entry is an empty field (Reserved) in the NVMe standard and in the present embodiment, the field is used to set the timestamp of the deadline time. For example, if the issued command is a write command or a read command, the deadline time by which the write command or read command is to be processed is set to the field.

FIG. 4 shows an example of the format of the timestamp set to an 8-byte field. As shown in FIG. 4, the timestamp is set to the [5-0] bytes of the 8-byte field. The timestamp is expressed by, for example, the number of milliseconds (ms) that have elapsed since midnight on Jan. 1, 1970 (UTC).

The host 2 can also issue an abort command to request cancellation of a command submitted to the submission queue 31. For example, the abort command is submitted to the admin submission queue and processed as a best effort command. In the abort command, for example, identification information of a command to be canceled and identification information of the submission queue 31 to which the command is submitted are specified.

Returning to FIG. 2, the controller 4 recognizes the priority of processing of each command based on the deadline time designated by the host 2. Then, the controller 4 schedules the commands in the submission queue 31 according to their priorities. Accordingly, for example, when multiple submission queues 31 are included in the host 2, a case where processing of commands in a specific submission queue is focused on too much and so processing of commands in other submission queues is delayed so that applications in the host 2 are made to wait more than necessary can be avoided.

More specifically, the controller 4 fetches one command from the submission queue 31 based on the deadline time designated for each command. Based on the deadline time of each of one or more commands stored in the submission queue 31, the controller 4 determines scheduling of command processing that can, for example, process each of the one or more commands up to the respective deadline times and reduce the power consumed by the SSD 3. The scheduling indicates, for example, the timing at which each command is executed (fetched). In addition, in the scheduling, the timing is determined based on the deadline time so that, for example, the start of processing corresponding to each command is delayed as much as possible.

When a command that has been submitted into the submission queue 31 is to be canceled by issuing an abort command, for example, in accordance with a user operation or the like that cancels a certain operation halfway through the operation, the possibility of avoiding a situation in which processing corresponding to the submitted command is already being performed or has already been performed is increased by scheduling to delay the start of processing corresponding to each command as much as possible. Accordingly, it is possible to reduce the power consumption of the SSD by the amount of power required for processing to be canceled.

When multiple submission queues 31 (admin submission queue and I/O submission queue) are provided in the host 2, the round robin, the weighted round robin, and vendor-specific arbitration are specified in the NVMe standard as three arbitration algorithms of these queues 31.

In the round-robin arbitration, as shown in FIG. 5, the submission queues 31 are treated with equal priority. The controller 4 may select (fetch) multiple candidate commands for processing from each of the submission queues 31 per round.

Figure 6:
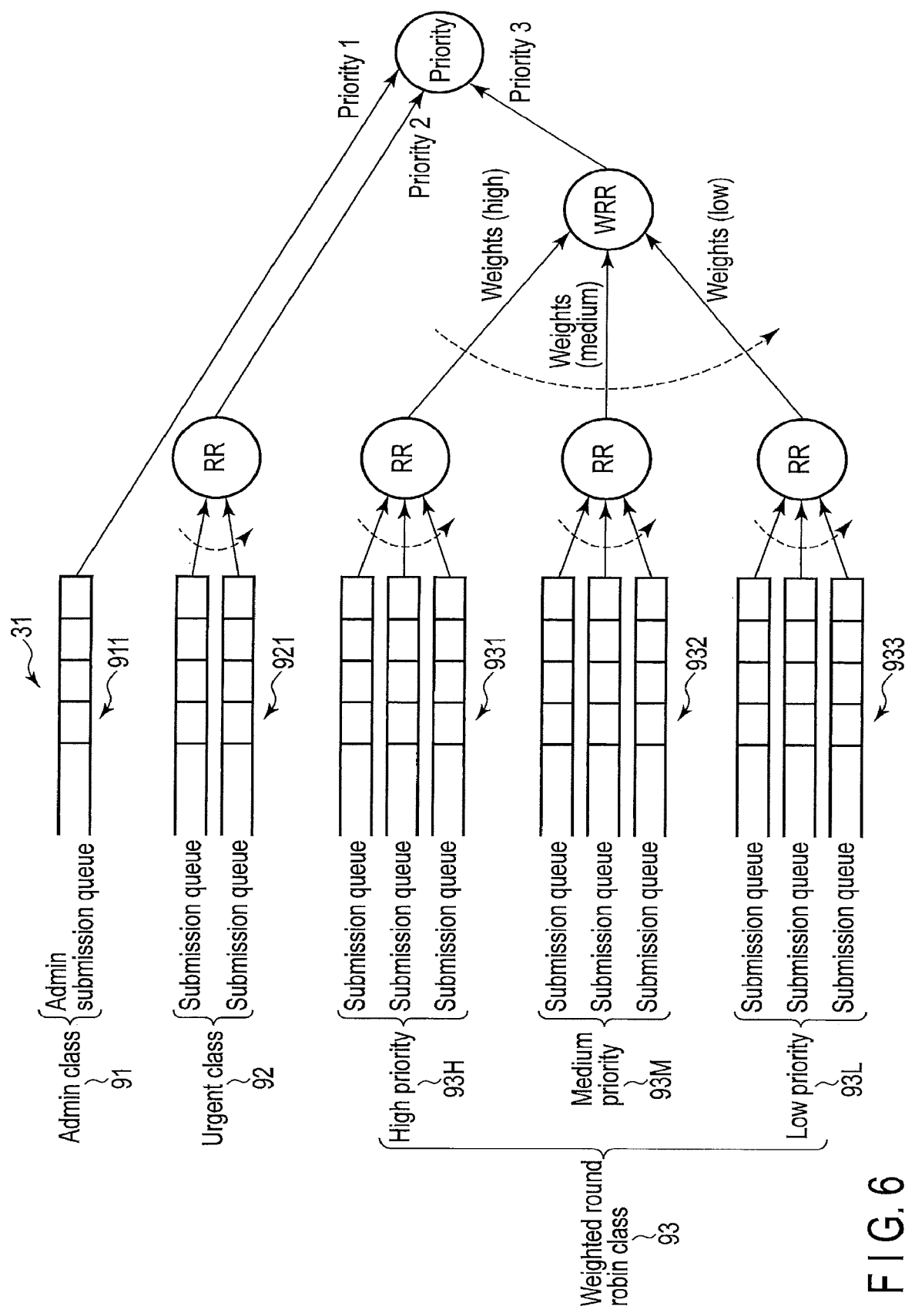
FIG. 6 is a diagram showing an example of weighted round robin arbitration of commands.

As shown in FIG. 6, in the weighted round robin arbitration, there are three priority classes and three priority levels. The three priority classes include an admin class 91 of the highest priority, an urgent class 92 of the next highest priority, and a weighted round robin class 93 of the lowest priority.

An admin submission queue 911 is assigned to the admin class 91. Commands issued (submitted) to the admin submission queue 911 have a higher priority than commands issued to the submission queues assigned to the classes 92, 93 other than the admin class 91.

Commands issued to an I/O submission queue 921 assigned to the urgent class 92 are processed after commands issued to the admin submission queue 911 and before commands issued to the submission queues assigned to the weighted round robin class 93. Note that the round-robin is used to arbitrate within multiple I/O submission queues 921 assigned to the urgent class 92.

The weighted round robin class 93 includes three levels of a high priority (High) 93H, a medium priority (Medium) 93M, and a low priority (Low) 93L that share the remaining bandwidth using the weighted round robin arbitration. I/O submission queues 931, 932, 933 are assigned to each of the levels 93H, 93M, 93L. The round-robin is used to arbitrate within multiple I/O submission queues assigned to the same level. Then, per round of the weighted round robin, for example, as many candidate commands as corresponding to weights are selected from each level.

In such round robin and weighted round robin arbitration, after a specified number of commands are fetched from a certain submission queue, the target queue from which commands are fetched is changed from the certain submission queue to another submission queue. Thus, for example, when a large number of commands in small units (4 KiB) are temporarily submitted to a specific submission queue, requests from other submission queues will be kept waiting.

As the arbitration mechanisms of the NVMe standard, the vendor-specific arbitration mechanism is further specified. The mechanism is outside the scope of the NVMe specification. A vendor may choose to implement the vendor-specific arbitration mechanism.

In the present embodiment, the SSD 3 is configured so that the vendor-specific arbitration is used. As the vendor-specific arbitration, arbitration based on scheduling in consideration of the deadline time is set for a command for which the deadline time by which processing of the command is to be performed is designated. As such scheduling, various kinds of scheduling in which the OS dynamically determines the order of execution of processing can be used and, for example, Earliest Deadline First (EDF) that processes in order of deadline time, Least Laxity (LL), Earliest Deadline Zero Laxity (EDZL), Earliest Deadline Critical Laxity (EDCL), and Least Slack Time (LST) can be cited.

FIG. 7 shows an example of arbitration based on EDF scheduling. Here, it is assumed that four submission queues 31-1, 31-2, 31-3, 31-4 are provided in the host 2. Multiple commands 351 to 362 are stored in each of the submission queues 31-1, 31-2, 31-3, 31-4.

The controller 4 fetches the commands 351 to 362 stored in the submission queues 31-1, 31-2, 31-3, 31-4 in order of designated deadline time. In the example shown in FIG. 7, the controller 4 fetches commands in order of deadline time like the command 351 having a deadline time of 5 milliseconds, the command 361 having a deadline time of 8 milliseconds, the command 352 having a deadline time of 10 milliseconds, the command 357 having a deadline time of 15 milliseconds, . . . .

Fair arbitration can be performed for all submission queues due to arbitration based on such EDF scheduling. Thus, the computer system 1 including the host 2 and the SSD 3 can be realized as a soft real-time system and the worst latency of access from the host 2 to the SSD 3 can be reduced.

The soft real-time system is a system in which, even if an event (deadline miss) in which processing of a task given to the system did not end within the deadline time occurs, fatal damage does not occur to the entire system and the value of the processing decreases in accordance with the completion time and the like. On the other hand, a hard real-time system is a system that fails due to a deadline miss and a firm real-time system is a system to which a deadline miss does not cause fatal damage, but in which the value of the processing instantaneously decreases to zero due to a failure to end by the deadline time.

Returning to FIG. 2, the controller 4 executes the fetched command. That is, the controller 4 cooperates with each unit in the SSD 3 to perform processing (for example, read processing, write processing, etc.) in accordance with the command.

When execution of the command is completed, the controller 4 writes a completion queue entry indicative of the fetched command and the command completion time to the completion queue 32. Accordingly, the host 2 can acquire the completion time of each command. The command completion time may be the time at which the processing corresponding to the command is completed or the time at which the operation (for example, the fetch, data transfer start, data transfer completion, interrupt notification, etc.) for which the deadline time is intended was actually performed.

The completion queue 32 is used to make notification of the status of each completed command. The completed command is uniquely identified based on a pair of the identification information of the associated submission queue and the command identification information assigned by the host 2. Multiple submission queues 31 may be associated with one completion queue 32. Each entry in the completion queue 32 is, for example, at least 16 bytes in size.

FIG. 8 shows an example of the format (response message protocol) of a completion queue entry used in the computer system 1. Here, a case where the format of a completion queue entry shown in the NVMe standard (Revision 1.3) is changed so as to further designate information about the command completion time will be described.

This format is configured to provide notification of the success/failure of command execution and its cause and the status of the submission queue 31 and the completion queue 32. In the present embodiment, a field of Dword 0 corresponding to the [3-0] bytes and a field of Dword 1 corresponding to the [7-4] bytes in a completion queue entry are used as an area to set the timestamp of the completion time of a command. For example, when the issued command is a write command or a read command, the time at which the processing of the write command or read command is completed is set to this field. Further, a field corresponding to the [29-28] bits in a field corresponding to the [15-12] bytes in the entry is used as a field to set information (Expired) indicating whether a command is processed by exceeding the designated deadline time.

The host 2 can recognize that there is a command that could not be processed within the specified deadline time using this completion queue entry. Accordingly, the host 2 can take measures such as making notification to users who use an application, adjusting the command submission amount, considering using another storage device when multiple storage devices are provided, and stopping another application accessing a storage device frequently if the application is not needed.

In addition, the device driver 43 of the host 2 may further include a wear degree estimating unit 432. The wear degree estimating unit 432 analyzes the completion queue entries as responses from the SSD 3 regarding the processed commands to estimate the wear degree of the SSD 3. The completion queue entry includes, for example, the command completion time and information indicating whether the command has been processed exceeding the designated deadline time. The wear degree estimating unit 432 estimates the wear degree of the SSD 3 in accordance with whether the command was processed by the deadline time by using information indicating whether the command has been processed exceeding the designated deadline time or comparing the command completion time and the deadline time requested by the host 2.

The method of utilizing the estimated wear degree depends on the work of the host 2 and many application examples can be considered, for example, the following three examples can be cited.

(1) Judging that the SSD 3 is reaching its service life, issue a warning to the user and prompt for replacement.

(2) Move the data of the error area (LBA+size) to another area and release the error area (refresh).

(3) In the computer system 1 using multiple SSDs, take steps as described below:

Among multiple SSDs, the SSD with the maximum number of violations for which the command was not processed by the deadline time is judged as having reached the end of life and replaced.

When selecting the SSD of the write destination from multiple SSDs, make it harder for SSDs with more violations to be selected.

When multiple SSDs include an SSD of replica such as a mirror, commands designating longer deadline times are issued to SSDs with more violations. In accordance with the fact that processing such as a read operation is actually performed in the SSD having a small number of violations, commands are canceled so that actual processing is not performed in the SSD in which the number of violations is large. In other words, in the SSD with a large number of violations, commands are made to be more easily canceled by specifying a long deadline time.

Next, the flowchart of FIG. 9 shows an example of the procedure of command issuance processing performed by the host 2.

The host 2 determines whether issuance of a command to the SSD 3 is requested by the application 41, the OS 42 or the like executed on the host 2 (step S11). If issuance of a command is not requested (NO in step S11), the processing returns to step S11.

If issuance of a command is requested (YES in step S11), the host 2 determines the deadline time of processing of the command (step S12). Then, the host 2 submits the command for which the deadline time is designated to the submission queue (step S13). For example, the host 2 writes the command ID, the deadline time, and the like to the submission queue entry.

With the above processing above, a command corresponding to the request can be submitted to the submission queue 31.

Figure 10:
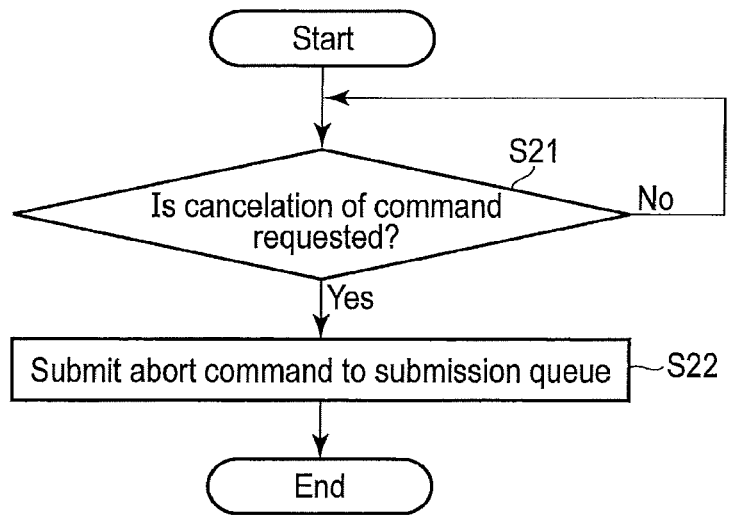
FIG. 10 is a flowchart showing an example of the procedure of command abort processing performed by the host provided in the computer system of the embodiment.

The flowchart of FIG. 10 shows an example of the procedure of command abort processing performed by the host 2.

The host 2 determines whether cancellation of the command submitted to the submission queue 31 is requested (step S21). In accordance with, for example, a process corresponding to the issued (submitted) command being canceled, the host 2 determines that the cancellation of the command is requested. If the cancellation of the command is not requested (NO in step S21), the processing returns to step S21.

If the cancellation of the command is requested (YES in step S21), the host 2 submits an abort command to cancel the command to the submission queue (admin submission queue) 31 (step S22).

In response to the abort command, the controller 4 of the SSD 3 can perform processing to cancel the processing of the designated command.

The flowchart of FIG. 11 shows an example of the procedure of the execution control processing performed by the controller 4 of the SSD 3. Here, in order to make the description easier to understand, a case where multiple commands are collectively submitted to the submission queue 31 and a new command is not submitted during the processing will be exemplified.

The controller 4 determines whether a command has been submitted to the submission queue 31 (step S31). If no command is submitted to the submission queue 31 (NO in step S31), the processing returns to step S31.

If commands are submitted to the submission queue 31 (YES in step S31), the controller 4 determines scheduling indicative of the timing at which each command is processed (fetched) based on the deadline time designated for each command in the submission queue 31 (step S32).

Next, the controller 4 determines whether there is a command to be fetched based on the determined scheduling (step S33). If there is a command to be fetched (YES in step S33), the controller 4 fetches the command from the submission queue 31 (step S35).

On the other hand, if there is no command to be fetched (NO in step S34), the controller 4 waits until the timing at which a command is to be fetched based on the scheduling (step S34) and thereafter fetches a command from the submission queue 31 (step S35). Incidentally, the SSD 3 may transition to a low power consumption state during the wait in step S34.

The controller 4 performs processing corresponding to the fetched command (step S36). For example, the controller 4 reads data from the NAND flash memory 5 in accordance with a read command or writes data to the NAND flash memory 5 in accordance with a write command.

Then, the controller 4 determines whether the execution of processing corresponding to the command has been completed (step S37). If the execution has not been completed (NO in step S37), the processing returns to step S37.

If the execution has been completed (YES in step S37), the controller 4 writes a completion queue entry for the completed command to the completion queue 32 (step S38). A completion queue entry includes the completion time and information indicating whether execution has been completed by the deadline time.

Next, the controller 4 determines whether the processing corresponding to all the submitted commands has been completed (step S39). If the processing corresponding to all the commands has not been completed (NO in step S39), the processing returns to step S33 to continue with the processing based on the scheduling.

On the other hand, if the processing corresponding to all the commands has been completed (YES in step S39), the processing returns to step S31.

When a new command is submitted during the above processing, the execution (fetch) of the commands including the new command in the submission queue may be rescheduled.

With the above configuration, it is possible to reduce the power consumption of the SSD 3 while scheduling commands according to the situation. The host 2 issues one or more commands with the designated deadline time of processing and submits the commands to a queue. Based on each deadline time, the SSD 3 determines scheduling indicative of the timing at which each command is to be executed. The SSD 3 determines the scheduling so that the commands are processed by each deadline time and the period during which the SSD 3 can transition to the low power consumption state can be made longer. Therefore, in the computer system 1, the power consumption of the SSD 3 can be reduced while scheduling one or more commands according to the situation of one or more deadline times corresponding to the one or more commands.

Hereinafter, some examples of applications to which the computer system 1 having the above-described configuration is applied will be described.

Application Example 1

Figure 12:
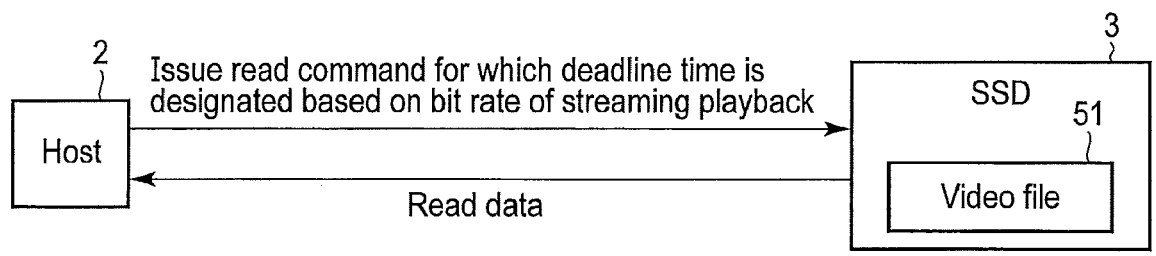
FIG. 12 is a diagram illustrating a streaming operation in the computer system of the embodiment.

FIG. 12 shows an example of a streaming operation to play back video in the computer system 1. Here, a use case in which while reading a streaming video file 51 stored in the SSD 3, the host 2 plays back video based on the data of the streaming video file 51 that has been read.

In the playback of a video file, the bit rate at which a stream (data) is to be read is known in advance from stream information such as program stream (PS)/transport stream (TS) in the file. If the host issues a large number of read commands to the SSD, under ordinary operation, the SSD cannot transition to the low power consumption state (low power consumption mode) until the processing of all the read commands is completed.

In the present embodiment, when a read command for reading the video file 51 is issued, the host 2 issues a read command designating the time by which the SSD 3 is to respond to the host 2 as a deadline time and submits the read command to the submission queue 31. The controller 4 of the SSD 3 schedules the timing at which each command is processed in such a way that each command can respond by the designated deadline time and the power consumption of the SSD 3 is reduced.

Even if there is a command (request) in the submission queue 31 and, for example, the deadline time of the command is 10 minutes later, the controller 4 determines that the command is a low priority command and gives priority to other commands. For a read command whose deadline time to be responded is 10 minutes later, even if the SSD 3 returns to the normal power state (normal mode) after being set to the low power state, for example, for 9 minutes from the present time to start reading of data corresponding to the read command, the host 2 can properly play back the video without a failure.

Further, there is a possibility that the playback of video may be instructed to stop in the host 2 five minutes later from the present time and in such a case, if the data after 5 minutes later from the present time has been previously read, the energy (electric power) consumed by the reading is wasted.

For example, the bit rate of video data is about 10 Mbps for DVD, 30 to 50 Mbps for Blu-ray (registered trademark), and 80 to 100 Mbps for Ultra HD Blu-ray and compared with 1000 to 3000 MB/s of the sequential read performance of SSD 3, the above bit rates are less than one several hundredth. If the power of the SSD 3 can be lowered by lowering the read speed of the SSD 3, the peak power can also be reduced by reducing the parallel operation of the NAND flash memory 5 to 1/N.

Whether to read the video data is in advance depends on the implementation of an application, but if the processing flow is such that each time processing of one read command is completed, the next read command is issued to continue to keep the buffer full, not only the SSD 3, but also the CPU core (processor core) in the host 2 cannot transition to a low power consumption state for a long time.

In addition, in recent PC platforms, hardware decoders are often mounted in CPUs or GPUs. Because the decoding time by the hardware decoder is deterministic, video can properly be played back as long as data can be supplied to the host 2 by the designated deadline time.

Application Example 2

FIG. 13 shows an example of a download operation of a file in the computer system 1. Here, a use case in which while downloading a large-size file from a server or the like on a network over a long time, the host 2 writes the data of the file to the SSD 3 is assumed. In the host 2, it is assumed that the approximate bit rate of the download speed is already known.

The host 2 issues a write command to write the downloaded data and submits the write command to the submission queue 31. For the write command, the deadline time by which data is to be written to the SSD 3 is designated based on the bit rate of download.

Even if there is a command in the submission queue 31 and, for example, the deadline time of the command is 10 minutes later, the controller 4 determines that the command is a low priority command and gives priority to other commands. In addition, for a write command whose deadline time to be written is 3 minutes later, for example, even if writing of data is started 2 minutes later from the present time, the host 2 can download the file properly.

For example, when the host 2 downloads a file of 1 GB at a bit rate of 8 Mbps over about 16 minutes, the controller 4 does not have to write the downloaded data at full speed up to the limit of the write performance of the SSD 3 to the NAND flash memory 5. If the SSD 3 writes data at a rate of 8 Mbps while delaying up to the maximum, the download operation by the host 2 and the SSD 3 will not fail.

With such an operation, it is expected that the response when the user requests execution of different processing during downloading will improve. In addition, if the downloading of the file is canceled, the data already written to the SSD 3 becomes unnecessary and is deleted. Therefore, the data whose processing corresponding to the write command has been completed becomes wasteful due to the cancellation of downloading.

However, when the start of processing corresponding to the write command has been delayed, the host 2 can cancel the write command in the submission queue 31 by issuing an abort command.

Therefore, in the SSD 3 using the NAND flash memory 5 limited in the number of times of writing/erasing (the number of program/erase cycles), it is expected that the lifetime thereof is prolonged.

Application Example 3

FIG. 14 shows an example of a backup operation of data from a first SSD 3A to a second SSD 3B in the computer system 1. The first SSD 3A and the second SSD 3B each have the similar configuration to the SSD 3 described above. Generally, the write performance of the SSD is often lower than the read performance. Here, it is assumed that, in each of the SSDs 3A, 3B, the sequential read performance of is 3000 MB/s and the sequential write performance is 1000 MB/s and thus, the read performance and the write performance are unbalanced. Although the case where the two SSDs 3A, 3B have the same the read/write performance is exemplified, the read/write performance of the first SSD 3A may be different from the read/write performance of the second SSD 3B.

The second SSD 3B cannot write data at the same writing speed as the reading speed (3000 MB/s) at which the first SSD 3A reads data at full speed (peak performance), which is the limit of its read performance. Generally, because the host 2 issues the next read command to the first SSD 3A after waiting for the completion of writing by the second SSD 3B, an idle time arises in the first SSD 3A for the time needed to write data to the second SSD 3B, but the first SSD 3A cannot transition to the low power consumption state by intermittently issuing a read command.

Therefore, when copying (backing up) the data stored in the first SSD 3A to the second SSD 3B, the host 2 notifies the first SSD 3A that data may be read slowly at a read speed (1000 MB/s) corresponding to the write performance of the second SSD 3B. More specifically, based on the read performance of the first SSD 3A and the write performance of the second SSD 3B, the host 2 determines the deadline time by which the read command to read data from the first SSD 3A is to be processed in such a way that the read speed corresponding to the write performance of the second SSD 3B is satisfied.

Then, the host 2 issues a read command with the designated deadline time and submits the read command to the submission queue 31 for the first SSD 3A. Accordingly, the first SSD 3A can schedule the execution timing of a read command based on the deadline time and, for example, after reading data up to the limit of the buffer capacity, the first SSD 3A transitions to a long-time low power consumption state.

The host 2 issues a write command to write the data read from the first SSD 3A to the second SSD 3B and submits the write command to the submission queue 31 for the second SSD 3B. When writing the data, the host 2 may designate the deadline time so that the second SSD 3B exerts the write performance (1000 MB/s).

When it is more important to lower the peak power consumed by the SSDs 3A and 3B than to complete the backup in a short time, commands are scheduled such that priority is given to decreasing the number of parallel program/read operations for the NAND flash memory 5. Accordingly, peak power consumption can be reduced.

Application Example 4

FIG. 15 shows an example of access from the host 2 to a multilayer storage system 7 in the computer system 1. The multilayer storage system 7 includes multiple storage devices belonging to layers of different access performance. Here, the multilayer storage system 7 is assumed to include a high-speed cache SSD 3C having first read/write performance, a medium-speed data SSD 3D having second read/write performance lower than the first read/write performance, and a low-speed backup SSD 3E having third read/write performance lower than the second read/write performance. The cache SSD 3C, the data SSD 3D, and the backup SSD 3E each have the similar configuration to the SSD 3 described above.

In such a multilayer storage system, each storage device may have a function of returning to the host an error indicating that the time limit has been exceeded for commands that were not completed within the deadline time (time limit) (Fast Fail function). When the host issues a command to a storage device of a certain layer and an error indicating that the time limit has been exceeded for this command is returned, the host issuing a similar command to the storage device of another layer, thereby shortened the response time of commands in the multilayer storage system as a whole.

Instead of issuing a command to the storage device of another layer after receiving an error due to the Fast Fail function, the host 2 in the present embodiment issues commands for which a shorter deadline time is designated with increasing performance to each of storage devices 3C, 3D, 3E belonging to different layers speculatively at once. Upon receiving a response of normal completion from a storage device (for example, the cache SSD 3C) that has processed a command for which a short deadline time is designated, the host 2 further issues an abort command requesting cancellation of the command to each of other storage devices (for example, the data SSD 3D and the backup SSD 3E) to which commands designating a longer deadline time were issued.

Also, if the storage device (for example, the cache SSD 3C) that processed the command designating a short deadline time abnormally ends, the command processing in another storage device to which a command designating a longer deadline time was issued continues. In the multilayer storage system 7 having redundancy, as described above, speculative access is performed without consuming energy wastefully and the response time as a whole can also be shortened.

For example, it is assumed that read commands are issued from the host 2 to the multilayer storage system 7. As shown in FIG. 15, the host 2 issues a read command designating a deadline time of 5 milliseconds to the cache SSD 3C, a read command designating a deadline time of 50 milliseconds to the data SSD 3D, and a read command designating a deadline time of 500 milliseconds to the backup SSD 3E speculatively all at once. Then, when a response indicative of the normal completion of reading is received from the cache SSD 3C one millisecond after issuance of the command, the host 2 issues abort commands to cancel the read commands to the data SSD 3D and the backup SSD 3E.

FIG. 16 shows an example of a processing sequence when read commands are issued from the host 2 to the multilayer storage system 7. Here, in order to make the description easier to understand, a case where the cache SSD 3C and the data SSD 3D are provided in the multilayer storage system 7 is exemplified, but the same is also true when three or more SSDs (storage devices) are provided.

First, the host 2 sends requests (A1, A2) by issuing a first read command for which a deadline time of 50 milliseconds is designated to the data SSD 3D and a second read command for which a deadline time of 5 milliseconds is designated to the cache SSD 3C all at once. That is, these two read commands are issued without waiting for a specific time between the issuance of one read command and the issuance of the other read command. The issued commands are submitted to, for example, the submission queue 31 corresponding to each of the SSD 3C, 3D. When multiple read commands are issued together, compared with a case where the read commands are issued separately, the load on the host 2 is reduced by the amount of load needed for waiting.

The data SSD 3D waits (50−α) milliseconds (A3) based on the deadline time of 50 milliseconds designated for the first read command. The time α corresponds to, for example, the time needed for the data SSD 3D to perform read processing corresponding to the first read command. That is, the data SSD 3D determines the scheduling of the command processing so as to delay the start of the read processing corresponding to the first read command as much as possible. The scheduling indicates that, for example, fetch and read operations (A8, A9) will be performed after (50−α) milliseconds from the present time.

On the other hand, the cache SSD 3C, for example, immediately fetches the second read command based on the deadline time of 5 milliseconds designated for the second read command (A4). Then, the cache SSD 3C performs a read operation corresponding to the second read command (A5) and responds to the host 2 (A6). The response includes information indicating that the read operation completed normally if the read operation has completed normally. Hereinafter, it is assumed that the read operation has completed normally.

When receiving the response, the host 2 issues to the data SSD 3D an abort command to cancel the first read command issued to the data SSD 3D (A7). The data SSD 3D cancels the first read command in accordance with the abort command. Therefore, the scheduled operation to fetch (A8) and read (A9) the first read command is canceled.

Thus, though multiple read commands are issued to multiple SSDs in order to read certain data from the multilayer storage system 7, the SSDs are controlled such that one of the SSDs actually performs a read operation. Accordingly, the power consumed by the computer system 1 as a whole can be reduced and the wear of the NAND flash memory due to access can be reduced.

Incidentally, the cache SSD 3C and the data SSD 3D to which read commands are issued do not directly communicate. In the computer system 1, the deadline time is designated for each command issued by the host 2 and the operation is controlled based on the deadline time in each of the SSDs 3C, 3D and thus, communication between the SSD 3C and the SSD 3D is unnecessary.

Next, the relationship between the command processing and the power state in the SSD 3 will be described with reference to FIGS. 17 to 19.

Figure 17:
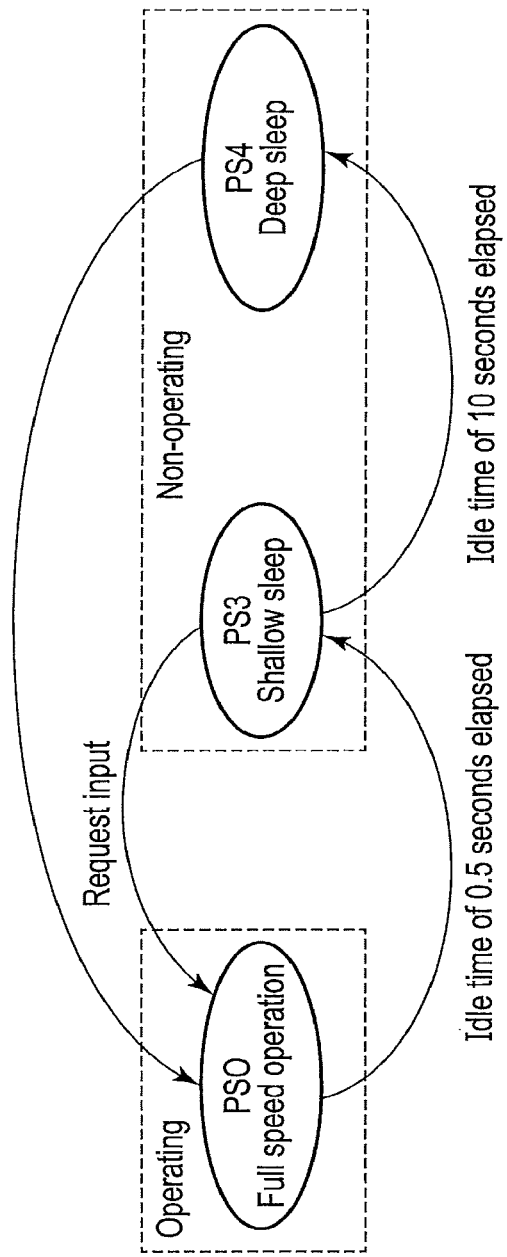
FIG. 17 is a diagram showing an example of transition of a power state in an SSD provided in the computer system of the embodiment.

FIG. 17 shows an example of three power states in the operation of the SSD 3 and transitions between these states.

A power state PS0 is a power state in which the SSD 3 operates at full speed. That is, the SSD 3 in the power state PS0 is said to be in an operating state. The maximum power of the SSD 3 in the power state PS0 is, for example, 5 W. Here, only PS0 is shown as a power state in the operating state, but power states PS1, PS2 with lower power consumption than PS0 may further be provided.

A power state PS3 is a power state in which the SSD 3 is in the shallow sleep state. The maximum power of the SSD 3 in the power state PS3 is, for example, 50 mW. A power state PS4 is a power state in which the SSD 3 is in the deep sleep state. The maximum power of the SSD 3 in the power state PS4 is, for example, 2.5 mW. The SSD 3 in the power state PS3 or PS4 is in a non-operating state.

Hereinafter, in order to make the description easier to understand, as shown in FIG. 17, a case where the SSD 3 operates in one of the three power states PS0, PS3, PS4 will be exemplified.

The SSD 3 in the power state PS0 transitions to the power state PS3 in response to the elapse of the idle time of 0.5 seconds. The SSD 3 in the power state PS3 transitions to the power state PS4 in response to the elapse of the idle time of 10 seconds. In addition, the SSD 3 in the power state PS3 or PS4 transitions to the power state PS0 in response to the submission of a request (command).

Figure 18:
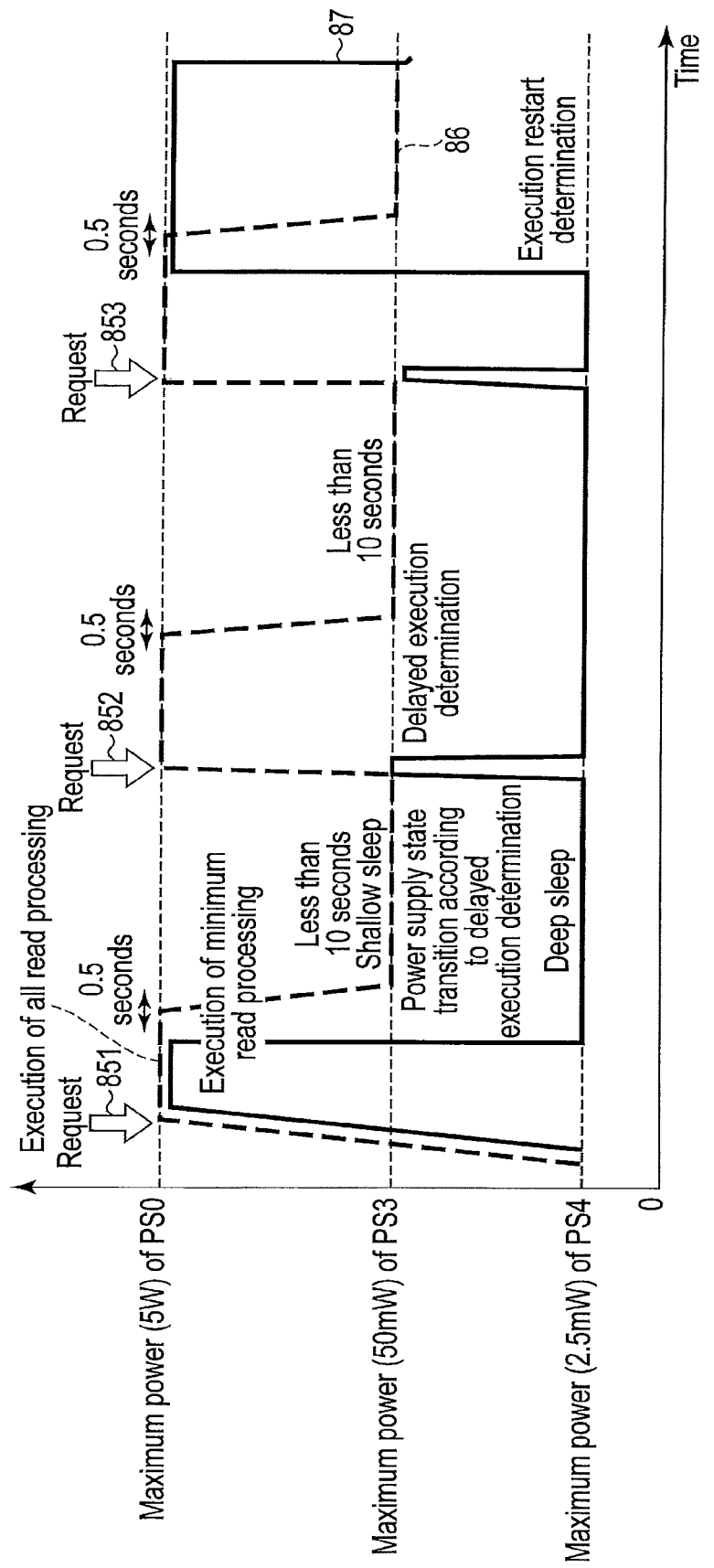
FIG. 18 is a diagram illustrating a change in power consumption of the SSD provided in the computer system of the embodiment.

FIG. 18 shows an example of changes in power consumption when the SSD 3, which makes state transitions as described above, processes commands. In the example shown in FIG. 18, changes of power consumption 86 by the operation without scheduling based on the deadline time and power consumption 87 by the operation with scheduling based on the deadline time are shown when requests 851, 852, 853 are submitted three times. Here, as an example, it is assumed that each of the requests 851, 852, 853 includes one or more read commands.

First, the power consumption 86 due to the operation without scheduling based on the deadline time will be described. In response to the submission of the first request 851, the SSD 3 transitions from PS4 to PS0 and performs all read processing in accordance with the request 851. Thereafter, when the idle time of 0.5 seconds elapses, the SSD 3 enters a shallow sleep state by transitioning from PS0 to PS3. In PS3 corresponding to the shallow sleep, power lower than that in PS0 is consumed.

In response to the submission of the second request 852 while the period of the shallow sleep is less than 10 seconds, the SSD 3 transitions from PS3 to PS0 and performs all the read processing according to the request 852. Thereafter, when the idle time of 0.5 seconds elapses, the SSD 3 enters a shallow sleep state by transitioning from PS0 to PS3.

Further, in response to the submission of the third request 853 while the period of the shallow sleep is less than 10 seconds, the SSD 3 transitions from PS3 to PS0 and performs all the read processing according to the request 853. Thereafter, when the idle time of 0.5 seconds elapses, the SSD 3 enters a shallow sleep state by transitioning from PS0 to PS3.

As described above, the SSD 3 transitions from PS3 to PS4 (deep sleep) in response to the elapse of the idle time of 10 seconds. Thus, if the interval between the transition to PS3 after a certain request is processed and the submission of a new request is less than 10 seconds, the SSD 3 repeats the transition between PS0 and PS3 and does not transition to PS4.

Next, the power consumption 87 by the operation with scheduling based on the deadline time in the computer system 1 according to the present embodiment will be described.

In response to the submission of the first request 851, the SSD 3 transitions from PS4 to PS0 and performs the necessary minimum read processing in accordance with the request 851 before transitioning to PS4. That is, based on the deadline time, the SSD 3 performs only read processing that cannot be delayed by scheduling so that read processing is performed with the longest possible delay. Then, the SSD 3 transitions from PS0 to PS4 to enter the deep sleep until the time at which delayed read processing is to be processed or a new request is submitted. In PS4 corresponding to deep sleep, power than that in the shallow sleep PS3 is consumed.

In response to the submission of the second request 852 during deep sleep, the SSD 3 transitions from PS4 to PS3, determines that it is possible to delay execution of all read processing in accordance with the request 852, and schedules read processing to be delayed. Because execution of all read processing in accordance with the request 852 can be delayed, the SSD 3 again transitions from PS3 to PS4.

Further, in response to the submission of the third request 853 during deep sleep, the SSD 3 transitions from PS4 to PS3, determines that it is possible to delay execution of all read processing in accordance with the request 853, and schedules read processing to be delayed. Because execution of all read processing in accordance with the request 853 can be delayed, the SSD 3 again transitions from PS3 to PS4.

Thereafter, when the time for restarting the execution of read processing reaches based on the scheduling, the SSD 3 transitions from PS4 to PS0 to perform read processing. Accordingly, the read processing is performed so that the requests 851, 852, 853 are processed by the deadline times. Then, the SSD 3 transitions from PS0 to PS3 (or PS4).

As described above, the SSD 3 schedules based on the deadline time designated in the request (read command) so as to perform read processing with the longest possible delay and performs the minimum read processing before transitioning from PS0 to PS4. Therefore, the SSD 3 is set in PS4 with the lowest power consumption if possible except for the transition to PS0 when read processing is necessary based on the scheduling and the transition to PS3 when a new request is submitted.

FIG. 19 shows the ratio of periods set in each of the power states PS0, PS3, PS4 of the entire period shown in FIG. 18 when not scheduled based on the deadline time and when scheduled based on the deadline time.

The ratio of the period set in PS0 operating at full speed is 10% in both cases of without scheduling based on deadline time and with scheduling based on deadline time. That is, with the same processing contents corresponding to the requests 851, 852, 853, the active time of PS0 is the same.

The ratio of the period set in the shallow sleep PS3 is 90% in the case of no scheduling based on the deadline time and 1% in the case of the scheduling based on the deadline time. In addition, the ratio of the period set in the deep sleep PS4 is 0% in the case of no scheduling based on the deadline time and 89% in the case of the scheduling based on the deadline time.

When there is no scheduling based on the deadline time, there is no period set in PS4 because if the interval between the transition to PS3 after processing a certain request and the submission of a new request is less than 10 seconds, the SSD 3 does not transition to PS4 by repeating the transition between PS0 and PS3. In addition, when scheduled based on the deadline time, the period set in PS4 is long because the SSD 3 transitions from PS0 to PS4 in response to the minimum processing being performed by scheduling so as to perform processing with the longest possible delay based on the deadline time. That is, the SSD 3 is set in PS4 with the lowest power consumption if possible except for cases where processing is necessary based on the scheduling and a new request is submitted.

Due to differences of the ratio of periods set in each of the power states PS0, PS3, PS4, while the total power consumed without scheduling based on the deadline time is 545 mW, the total power consumed with scheduling based on the deadline time is 503 mW. Therefore, in this example, it can be said that the power reduction effect of 7.8% can be obtained by scheduling based on the deadline time.

Next, with reference to FIGS. 20 and 21, an example for determining whether a certain SSD 3 is operating without scheduling based on the deadline time or with scheduling based on the deadline time will be described. Here, it is assumed that an ammeter for measuring a current flowing from the power source (for example, DC 3.3 V) that supplies power to the SSD 3 and a bus analyzer for observing with time information logical traffic (commands and data) of a bus (host I/F 11) between the host 2 and the SSD 3 are provided in the SSD 3.

Figure 20:
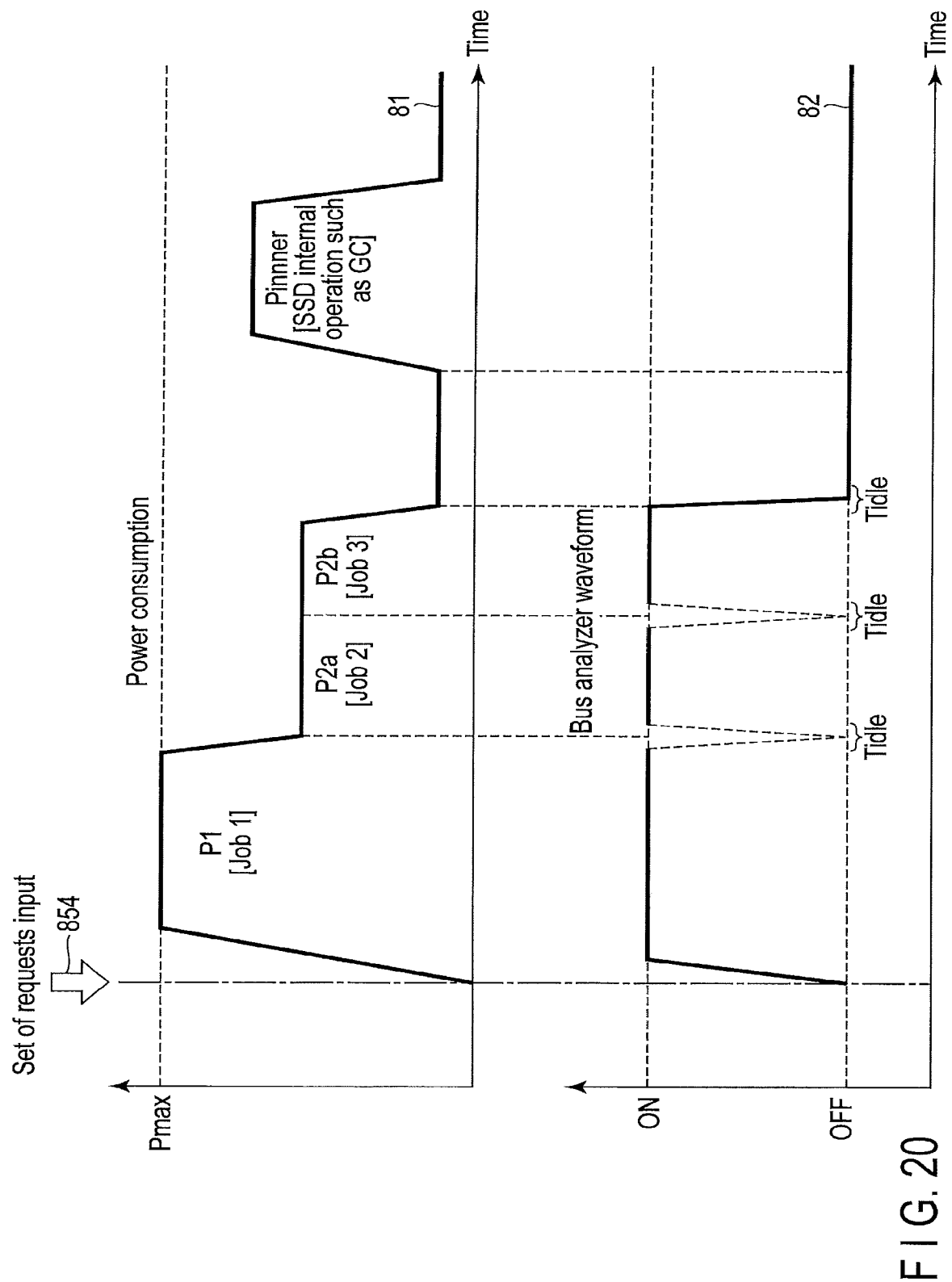
FIG. 20 is a diagram showing an example of transition of power consumption and a bus analyzer waveform in a computer system without scheduling based on the deadline time.

FIG. 20 shows the transitions of power consumption 81 and a bus analyzer waveform 82 that indicates the presence/absence of traffic in the SSD 3 operating without scheduling based on the deadline time.

First, the SSD 3 operates at power P1, P2a, P2b in order to process jobs 1, 2, 3 corresponding to requests (commands) 854 submitted collectively by the host 2, respectively. In the meantime, the bus analyzer waveform 82 almost indicates that there is traffic (ON), though a tiny idle time Tidle (for example, 1 ms) indicating that there is no traffic (OFF) to be transmitted with the host 2 is included at a corresponding position between the job 1 and the job 2 and at a corresponding position between the job 2 and the job 3.

In response to the completion of processing of the jobs 1, 2, 3 corresponding to the requests 854 and the elapse of the idle time Tidle exceeding the threshold value (for example, 0.5 seconds), the SSD 3 transitions to a low power consumption state (for example, PS3). In the meantime, because there is no traffic to be transmitted with the host 2, the bus analyzer waveform 82 indicates OFF.

Then, the SSD 3 operates at power Pinner not due to a request from the host 2, but for the internal operation of the SSD 3 such as GC. Since this is the internal operation of the SSD 3, there is no traffic to be transmitted with the host 2 in the meantime and the bus analyzer waveform 82 indicates OFF.

FIG. 21 shows the transitions of power consumption 83 and a bus analyzer waveform 84 that indicates the presence/absence of traffic in the SSD 3 operating with scheduling based on the deadline time according to the present embodiment.

First, the SSD 3 schedules the jobs 1, 2, 3 corresponding to the requests (commands) 854 submitted collectively by the host 2 based on the designated deadline times. Then, the SSD 3 operates at power P1 in order to process, among the jobs 1, 2, 3, the minimum job 1 to be processed immediately. In the meantime, because there is traffic to be transmitted with the host 2 in accordance with the processing of the job 1, the bus analyzer waveform 84 indicates ON.

In response to the completion of processing of the job 1, the SSD 3 enters a low power consumption state (for example, PS4) for a standby time Twait (for example, 100 ms) based on the scheduling. In the meantime, because there is no traffic to be transmitted with the host 2, the bus analyzer waveform 84 indicates OFF.

When the standby time Twait has elapsed, the SSD 3 operates at power P2 to process the job 2 based on the scheduling. In the meantime, because there is traffic to be transmitted with the host 2 in accordance with the processing of the job 2, the bus analyzer waveform 84 indicates ON.

Then, the SSD 3 transitions to a low power consumption state (for example, PS4) in response to the completion of processing of the job 2 and thereafter, operates at power Pinner not due to a request from the host 2, but for the internal operation of the SSD 3 such as GC. Since this is the internal operation of the SSD 3, there is no traffic to be transmitted with the host 2 in the meantime and the bus analyzer waveform 84 indicates OFF.

Further, after transitioning to a low power consumption state (for example, PS4) in response to the completion of the internal operation, the SSD 3 operates at power P3 to process the job 3 based on the scheduling. In the meantime, because there is traffic to be transmitted with the host 3 in accordance with the processing of the job 3, the bus analyzer waveform 84 indicates ON.

In the SSD operating without scheduling based on the deadline time shown in FIG. 20, the power consumption 81 remains high until the processing of the jobs 1, 2, 3 corresponding to the requests is completed and also the bus analyzer waveform 82 is kept ON except for OFF during the tiny idle time Tidle between jobs. Then, after the processing of the jobs 1, 2, 3 is completed, the power consumption 81 may become high due to the internal operation of the SSD 3 such as GC, the bus analyzer waveform 82 remains OFF until a subsequent request (job) is submitted. That is, no traffic will be generated with the host 2 as long as a subsequent request is not submitted.

In the SSD 3 according to the present embodiment operating with scheduling based on the deadline times shown in FIG. 21, by contrast, only the minimum job 1 among the jobs 1, 2, 3 corresponding to the requests is processed and processing of the other jobs 2, 3 is delayed as much as possible. Thus, in a state in which the processing of all the jobs 1, 2, 3 has not been completed (for example, only the processing of the job 1 has been completed), the power consumption 83 decreases (low power consumption state) and a long standby time Twait in which the bus analyzer waveform 84 is also OFF may occur. Further, after the standby time Twait, a new request is not submitted and a period in which power consumption increases (P2, P3) and the bus analyzer waveform 84 becomes ON occurs. Therefore, the long standby time Twait occurs within a period in which all the jobs 1, 2, 3 corresponding to the certain requests 854 are processed.

Consequently, there may be a difference in the length of time in which the bus analyzer waveforms 82, 84 are OFF in the period in which the jobs corresponding to the requests 854 are processed between the SSD 3 operating with scheduling based on the deadline time and the operation SSD 3 without scheduling based on the deadline time. For example, as shown in FIGS. 20 and 21, the standby time Twait between the job 1 processing and the job 2 processing in the SSD 3 operating with scheduling based on the deadline times is longer than the idle time Tidle between the job 1 processing and the job 2 processing in the SSD 3 operating without scheduling based on the deadline times.

Thus, if the standby time Twait longer than the idle time Tidle assumed in the SSD operating without scheduling based on the deadline times has occurred within a period in which all jobs corresponding to certain requests are processed, the SSD can be said to be the SSD 3 with scheduling based on the deadline times according to the present embodiment. Therefore, by measuring the power consumption and the bus analyzer waveform after requests by the host 2 is submitted, whether a certain SSD 3 is operating without scheduling based on the deadline times or with scheduling based on the deadline times can be determined.

Figure 22:
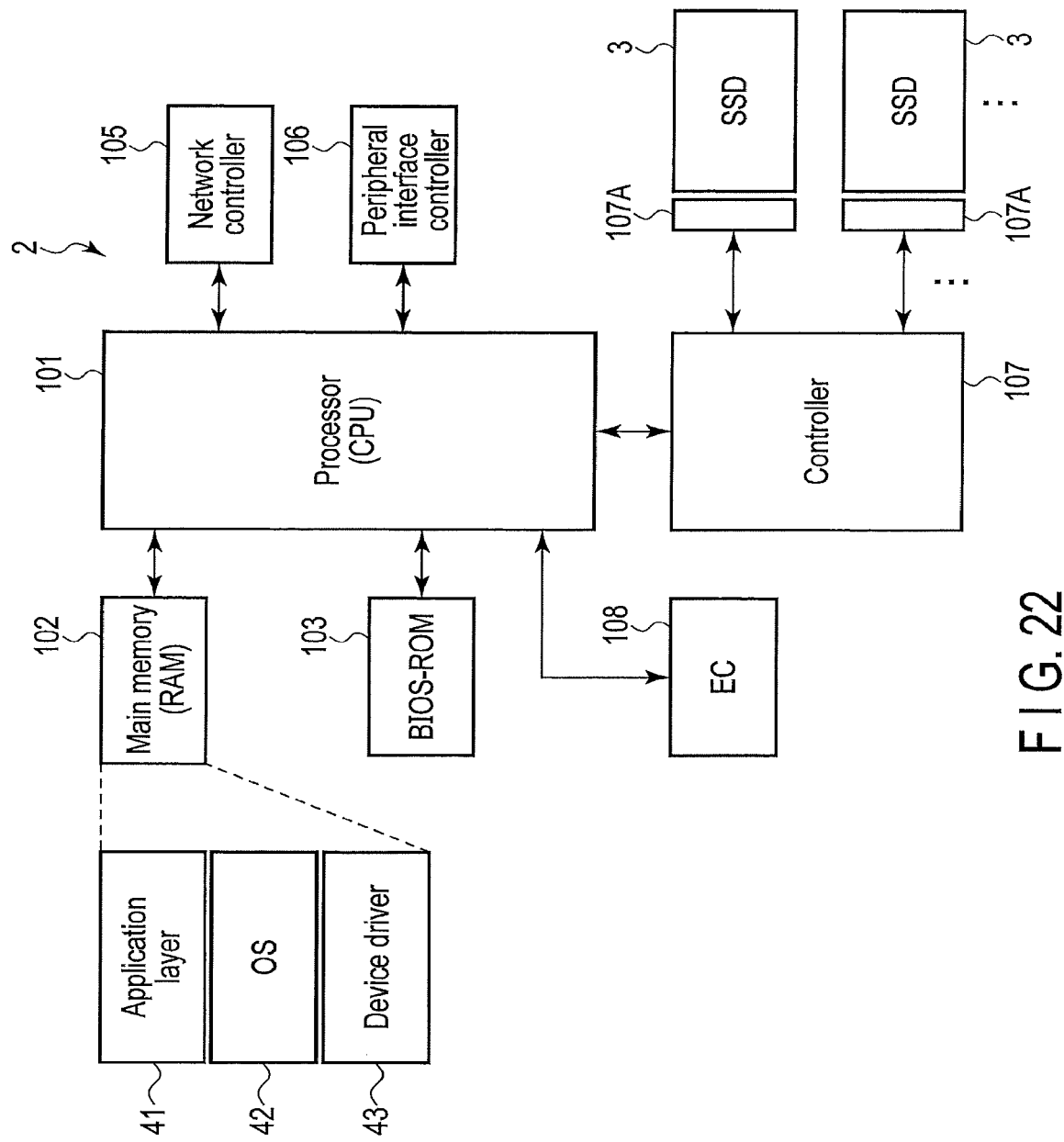
FIG. 22 is a block diagram showing a configuration example of the host provided in the computer system of the embodiment.

FIG. 22 shows a hardware configuration example of an information processing apparatus (computing device) functioning as the host 2.

The information processing apparatus is realized as a computing device such as a server (for example, a storage server). The information processing apparatus includes a processor (CPU) 101, a main memory 102, a BIOS-ROM 103, a network controller 105, a peripheral interface controller 106, a controller 107, an embedded controller (EC) 108 and the like.

The processor 101 is a CPU configured to control the operation of each component of the information processing apparatus. The processor 101 executes various programs loaded from one of the SSDs 3 into the main memory 102. The main memory 102 is constructed of a random access memory such as a DRAM. The programs executed by the processor 101 include the application layer 41, the OS 42, and the device driver 43 described above.

The processor 101 also executes a basic input/output system (BIOS) stored in the BIOS-ROM 103 as a nonvolatile memory. The BIOS is a system program for hardware control.

The network controller 105 is a communication device such as a wired LAN controller or a wireless LAN controller. For example, data can be transmitted to or received from a storage device by wired communication or wireless communication using the network controller 105.

The peripheral interface controller 106 is configured to perform communication with peripheral devices such as USB devices.

The controller 107 is configured to perform communication with devices connected to connectors 107A. The SSDs 3 may be connected to the connectors 107A, respectively. The controller 107 is a SAS expander, a PCIe switch, a PCIe expander, a flash array controller, a RAID controller or the like.

The EC 108 functions as a system controller configured to execute power management of the information processing apparatus. The EC 108 powers on or off the information processing apparatus in accordance with an operation of the power switch by the user. The EC 108 is implemented as a processing circuit like a one-chip microcontroller. The EC 108 may incorporate a keyboard controller for controlling an input device such as a keyboard.

According to the present embodiment, as described above, power consumption can be reduced while scheduling commands according to the situation. When the processor 101 in the host 2 is requested to issue one or more commands to the SSD 3, the processor 101 determines one or more deadline times by which the one or more commands are to be processed, respectively, and issues the one or more commands each with the one or more designated deadline time to the SSD 3. The controller 4 of the SSD 3 determines the scheduling indicative of the timing at which each of the one or more commands is executed based on the one or more deadline times and executes the one or more commands according to the scheduling.

In this way, the computer system 1 includes the host 2 that issues a command for which a deadline time corresponding to the situation is designated and the SSD 3 that properly schedules and processes the command. Accordingly, it is possible to reduce the amount of electric power consumed in the computer system 1 and to shorten the command response time in the worst case, that is, to improve QoS.

In addition, each of the various functions described in the present embodiment may be implemented by a circuit (processing circuit). Examples of the processing circuit include programmed processors such as central processing units (CPUs). The processor executes each of the described functions by executing computer programs (instructions) stored in the memory. The processor may be a microprocessor including an electrical circuit. Examples of the processing circuit include digital signal processors (DSPs), application specific integrated circuits (ASICs), microcontrollers, controllers, and other electrical circuit components. Each of components other than the CPU described in the present embodiment may also be implemented by the processing circuit.

Further, since various kinds of processing in the present embodiment can be implemented by computer programs, the same effects as those in the present embodiment can easily be implemented only by installing and executing such computer programs in a computer through a computer readable storage medium storing such computer programs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a memory; and
a processor configured to execute a program stored in the memory, wherein
the processor is configured to:
determine, when issuing a first command to a storage device is requested, a deadline time by which the first command is to be processed, wherein the storage device is capable of processing commands issued by the processor; and
issue the first command for which the deadline time is designated, to the storage device,
wherein the processor is configured to:
determine, when at least a portion of data constituting a file is written into the storage device while the file is being downloaded to the electronic device via a network, a first deadline time by which a write command for writing at least the portion of data is to be processed based on a speed at which the file is downloaded; and
issue the write command for which the first deadline time is designated to the storage device.

2. The electronic device of claim 1, wherein
the processor is configured to:
issue a first command for which a first deadline time is designated to a first storage device having first performance and a second command for which a second deadline time is designated to a second storage device having second performance lower than the first performance, wherein the second deadline time is longer than the first deadline time; and
issue an abort command for canceling the second command to the second storage device when processing of the first command by the first storage device is completed before processing of the second command by the second storage device is completed.

3. The electronic device of claim 1, wherein
the processor is further configured to estimate a wear degree of the storage device based on a time when processing of the first command by the storage device is completed.

4. The electronic device of claim 1, wherein
the processor stores the issued first command in a queue, and
the stored first command is fetched from the queue in accordance with scheduling determined based on the deadline time.

5. The electronic device of claim 1, wherein
the storage device comprises:
a nonvolatile memory; and
a controller electrically connected to the nonvolatile memory and capable of processing the commands in parallel.

6. The electronic device of claim 5, wherein
the controller is configured to determine, when one or more commands to be processed by one or more deadline times, respectively, are issued, scheduling indicative of timings at which the one or more commands are processed, respectively, based on the one or more deadline times.

7. A computer system comprising a storage device and a host, wherein
the host comprises:
a memory; and
a processor configured to execute a program stored in the memory, the processor is configured to:
determine, when issuing a first command to the storage device is requested, a deadline time by which the first command is to be processed; and
issue the first command for which the deadline time is designated, to the storage device,
the storage device is capable of processing commands issued by the processor, and the processor is configured to:
determine, when at least a portion of data constituting a file is written into the storage device while the file is being downloaded to the host via a network, a first deadline time by which a write command for writing at least the portion of data is to be processed based on a speed at which the file is downloaded; and
issue the write command for which the first deadline time is designated to the storage device.

8. The computer system of claim 7, wherein
the processor stores the issued first command in a queue, and
the stored first command is fetched from the queue in accordance with scheduling determined based on the deadline time.

9. The computer system of claim 7, wherein
the processor is configured to:
issue a first command for which a first deadline time is designated to a first storage device having first performance and a second command for which a second deadline time is designated to a second storage device having second performance lower than the first performance, wherein the second deadline time is longer than the first deadline time; and
issue an abort command for canceling the second command to the second storage device when processing of the first command by the first storage device is completed before processing of the second command by the second storage device is completed.

10. The computer system of claim 7, wherein
the processor is further configured to estimate a wear degree of the storage device based on a time when processing of the first command by the storage device is completed.

11. The computer system of claim 7, wherein
the storage device comprises:
a nonvolatile memory; and
a controller electrically connected to the nonvolatile memory and capable of processing the commands in parallel.

12. The computer system of claim 11, wherein
the controller is configured to determine, when one or more commands to be processed by one or more deadline times, respectively, are issued, scheduling indicative of timings at which the one or more commands are processed, respectively, based on the one or more deadline times.

13. An electronic device comprising:
a memory; and
a processor configured to execute a program stored in the memory, wherein
the processor is configured to:
determine, when issuing a first command to a storage device is requested, a deadline time by which the first command is to be processed, wherein the storage device is capable of processing commands issued by the processor; and
issue the first command for which the deadline time is designated to the storage device,
wherein the processor is configured to:
determine, when data stored in a first storage device is copied to a second storage device, a first deadline time by which a read command for reading the data is to be processed based on read performance of the first storage device and write performance of the second storage device; and
issue the read command for which the first deadline time is designated to the first storage device.

14. The electronic device of claim 13, wherein
the processor stores the issued first command in a queue, and
the stored first command is fetched from the queue in accordance with scheduling determined based on the deadline time.

15. The electronic device of claim 13, wherein
the processor is configured to:
issue a first command for which a first deadline time is designated to a first storage device having first performance and a second command for which a second deadline time is designated to a second storage device having second performance lower than the first performance, wherein the second deadline time is longer than the first deadline time; and
issue an abort command for canceling the second command to the second storage device when processing of the first command by the first storage device is completed before processing of the second command by the second storage device is completed.

16. The electronic device of claim 13, wherein
the processor is further configured to estimate a wear degree of the storage device based on a time when processing of the first command by the storage device is completed.

17. The electronic device of claim 13, wherein
the storage device comprises:
a nonvolatile memory; and
a controller electrically connected to the nonvolatile memory and capable of processing the commands in parallel.

18. The electronic device of claim 17, wherein
the controller is configured to determine, when one or more commands to be processed by one or more deadline times, respectively, are issued, scheduling indicative of timings at which the one or more commands are processed, respectively, based on the one or more deadline times.

* * * * *